US007627055B2

(12) United States Patent
Coersmeier

(10) Patent No.: US 7,627,055 B2
(45) Date of Patent: Dec. 1, 2009

(54) ERROR ADJUSTMENT IN DIRECT CONVERSION ARCHITECTURES

(75) Inventor: Edmund Coersmeier, Bochum (DE)

(73) Assignee: Nokia Corporation, Espoo (FI)

( * ) Notice: Subject to any disclaimer, the term of this patent is extended or adjusted under 35 U.S.C. 154(b) by 1054 days.

(21) Appl. No.: 10/408,106

(22) Filed: Apr. 8, 2003

(65) Prior Publication Data

US 2004/0193965 A1    Sep. 30, 2004

Related U.S. Application Data

(60) Provisional application No. 60/449,880, filed on Feb. 27, 2003.

(51) Int. Cl.
*H02H 3/05* (2006.01)
(52) U.S. Cl. .................................. 375/296; 455/114.3
(58) Field of Classification Search ............... 375/296, 375/297, 285; 455/91, 126, 114.3, 63.1
See application file for complete search history.

(56) References Cited

U.S. PATENT DOCUMENTS

| 6,275,685 | B1 * | 8/2001 | Wessel et al. ............... 455/126 |
| 6,985,704 | B2 * | 1/2006 | Yang et al. .................. 455/126 |
| 7,085,330 | B1 * | 8/2006 | Shirali ........................ 375/296 |
| 7,170,951 | B1 * | 1/2007 | Perthold et al. ............. 375/296 |
| 7,382,833 | B1 * | 6/2008 | Peterson et al. ............. 375/296 |
| 2001/0005402 | A1 * | 6/2001 | Nagatani et al. ............ 375/296 |
| 2002/0150171 | A1 * | 10/2002 | Myers ......................... 375/296 |
| 2003/0058959 | A1 * | 3/2003 | Rafie et al. .................. 375/296 |
| 2003/0156658 | A1 * | 8/2003 | Dartois ........................ 375/297 |
| 2003/0179830 | A1 * | 9/2003 | Eidson et al. ............... 375/296 |
| 2003/0179831 | A1 * | 9/2003 | Gupta et al. ................ 375/296 |
| 2003/0184374 | A1 * | 10/2003 | Huang et al. ................ 330/149 |

\* cited by examiner

*Primary Examiner*—Chieh M Fan
*Assistant Examiner*—Aristocratis Fotakis
(74) *Attorney, Agent, or Firm*—Squire, Sanders & Dempsey, LLP

(57) ABSTRACT

An error adjustment method of equalizing transmission characteristics of a signal processing circuitry is disclosed. In a first step, an original complex IQ signal is generated, on which error adjustment is performed. Then, the adjusted complex IQ signal is processed in the signal processing circuitry, thereby obtaining a processed real signal. The envelope of the real signal is detected and this real signal envelope and the original complex IQ signal are synchronized. The envelope of the original complex IQ signal is derived and the synchronized real signal envelope is compared with the synchronized original IQ signal envelope at two consecutive time instances. Finally, a processed complex IQ signal is obtained from the real signal envelope on the basis of the comparison result, which processed complex IQ signal is used in performing error adjustment.

27 Claims, 19 Drawing Sheets

ERROR ADJUSTMENT IN DIRECT CONVERSION ARCHITECTURES

CROSS REFERENCE TO RELATED APPLICATION

This application claims the benefit of the filing date of Provisional Patent Application Ser. No. 60/449,880, filed on Feb. 27, 2003, entitled "Error Adjustment in Direct Conversion Architectures", which application is incorporated herein by reference in its entirety.

BACKGROUND OF THE INVENTION

1. Field of the Invention

The present invention relates to error adjustment in direct conversion architectures. In particular, the invention relates to In-phase and Quadrature-phase based error detection and correction using an envelope based In-phase and Quadrature-phase extraction.

2. Description of the Prior Art

The use of digital wireless communication systems has recently been increasing. Systems of many different types have been introduced. For example, systems like Wireless LANs (Local Area Networks), digital radio DVB-T, UMTS and GSM are gaining more attention and users are given more alternatives in wireless communication. To get customers interested in new services it is essential that the equipment needed in order to use the services should be priced correctly. Transceivers with low cost and low power consumption are thus needed.

The Institute of Electrical and Electronics Engineers (IEEE) has developed a new specification 802.11a which represents the next generation of enterprize-class wireless local area networks (LANs). Among the advantages it has over current technologies are greater scalability, better interference immunity, and significantly higher speed, which simultaneously allows for higher bandwidth applications.

OFDM (Orthogonal Frequency Division Multiplex) is used as a new encoding scheme which offers benefits over spread spectrum in channel availability and data rate. Channel availability is significant because the more independent channels that are available, the more scalable the wireless network becomes. The high data rate is accomplished by combining many lower-speed subcarriers to create one high-speed channel. A large (wide) channel can transport more information per transmission than a small (narrow) one. The subcarriers are transmitted in parallel, meaning that they are sent and received simultaneously. The receiving device processes these individual signals, each one representing a fraction of the total data that, together, make up the actual signal. With many subcarriers comprising each channel, a tremendous amount of information can be sent at once.

The IEEE 802.11a wireless LAN standard defines a high system performance and therefore requires a certain signal accuracy for the OFDM transmitter output. Taking the analog base-band and radio frequency (RF) filter imperfections into account it is necessary to equalize the signal stream before transmission. The performance of a transmitter output signal is strongly dependent on the analog filter accuracy. To reach high signal accuracy, expensive and precise filters have to be used. However, in high volume products it is recommended to have those filters be as inexpensive as possible. It may be possible to insert low-cost and non-precise analog transmitter filters if a digital adaptive equalizer is installed to compensate for large amplitude ripple and group delay in the transmitter pass-band.

A solution in affordable transmitters is the use of a direct conversion analog front-end architecture in the transmitters. In the direct conversion solution, a digital base band signal is digital-to-analog converted and afterwards mixed into an RF signal. For the mixing process, two signals, a sine and a cosine signal, have to be provided. Because of technical reasons the precise orthogonality of both sinusoidal signals cannot be guaranteed; therefore an angle $\phi \neq 90°$ is measurable between the sine and cosine functions. This phenomenon is commonly called IQ phase imbalance. In addition, also an IQ amplitude imbalance arises between the I-branch and the Q-branch.

Moreover, analog base band components, such as analog filters, are always installed twice: one component for the I-branch and one component for the Q-branch. Because of manufacturing tolerances, different age or temperature influences, each component of a certain functional type may behave slightly differently compared with its counterpart on the other branch. Additionally, low-cost analog filters may contain amplitude ripple, non-linear phase and they may insert ISI (Inter Symbol Interference).

As an example, FIG. 1 shows a graph illustrating an I-branch and Q-branch ISI generated by analog filters in a direct conversion OFDM transmitter. No IQ phase or IQ amplitude imbalance errors are inserted so that only analog filter imperfections are visible.

The conjunction of frequency dependent base band devices with the constant IQ phase and amplitude imbalance imperfections results in frequency selective IQ phase and amplitude imbalance inaccuracies.

The phase and amplitude imbalance problem is present in any system employing direct conversion transmitters regardless of the modulation scheme or the multiple access solution. Particularly in a multicarrier system, such as WLAN, which uses OFDM, the problem is particularly severe, although it also affects single carrier systems, such as GSM or cable modems.

To provide the required high signal accuracy in transmitters in order to fulfill certain performance requirements at the receiver side it has to be guaranteed that analog direct conversion front-end imperfections, such as IQ phase and amplitude imbalance errors, will be minimal. So far, the solutions to the phase and amplitude imbalance problem have assumed the use of high quality analog base band components. Thus, the phase and amplitude imbalance correction methods have not taken frequency dependency into account. However, in low cost consumer appliances the use of high quality components is impossible. Therefore, the current correction methods do not present a solution to phase and amplitude imbalance correction in low cost receivers.

In addition, in direct conversion analog front end transmitters it is necessary to pre-correct the transmitted signal stream via fully digital adjustment loops. To find the appropriate error values the transmitter output signal has to be measured for example at the transmitter antenna input port and fed back to the transmitter digital domain.

The envelope of the high-frequency band signal can be measured by a detection diode. Envelope measurement has been done up to now via an amplitude level comparison. It has assumed that the envelope provides over a long period of time the same average value. This can be extracted from the measured analog signal and compared with the desired value. If the analog envelope average value is too low or too high certain adjustment algorithms can provide compensation.

With the invention of OFDM radios a much higher precision for the analog output signal is required. Hence algorithms for amplitude and phase imbalance adjustment have to become frequency selective to fulfill the requirements. But to run these algorithms there is much more envelope measurement precision required than to estimate whether the average amplitude is too high or too low. However, there is currently no other inexpensive, precise and stable solution to provide after that a complex base-band equivalent of the transmitted signal without installing a principle demodulator.

SUMMARY OF THE INVENTION

The present invention provides an improved error adjustment method and apparatus, by means of which the signal accuracy at a direct conversion architecture output can be improved to thereby reduce filter requirements.

The present invention provides a stable method for extracting from an envelope based real signal the corresponding In-phase and Quadrature-phase samples.

Advantages resulting therefrom are:

Fully frequency selective adjustment loops on transmitter side are possible.

A low cost direct conversion OFDM transceiver does not require a local transmitter receiver for IQ extraction.

A low cost diode for the envelope measurement is possible.

Moreover, according to the present invention, IQ phase and amplitude adjustment algorithms together are enabled to remove completely the frequency selective IQ phase and IQ amplitude errors and analog filter miss matching in an OFDM direct conversion transmitter, and provide a significant signal performance improvement for the system. Additionally, low cost devices may be implemented to the direct conversion analog front-end so that a low cost direct conversion OFDM transmitter can be provided.

Hence, the present invention provides a fully digital low cost solution for IQ phase and IQ amplitude imbalance problems.

DESCRIPTION OF THE EMBODIMENTS OF THE INVENTION

The embodiments of the invention can be applied in any data transmission system employing direct conversion architectures. Examples of such systems include Wireless LANs (Local Area Networks), digital radio DVB-T, UMTS and GSM. A direct conversion architecture arranged, for example, in a transmitter, is an architecture where a base band frequency is converted directly to a radio frequency (RF) signal to be transmitted without any intermediate frequency (IF) conversion in between.

As an example of a system to which the embodiments of the invention may be applied, a Wireless Local Area Network (WLAN) is considered. WLAN is a data transmission medium that uses radio waves in connecting computers to a network. The backbone network is usually wire line and the wireless connection is the last link of the connection between the LAN and users.

Figure 2:
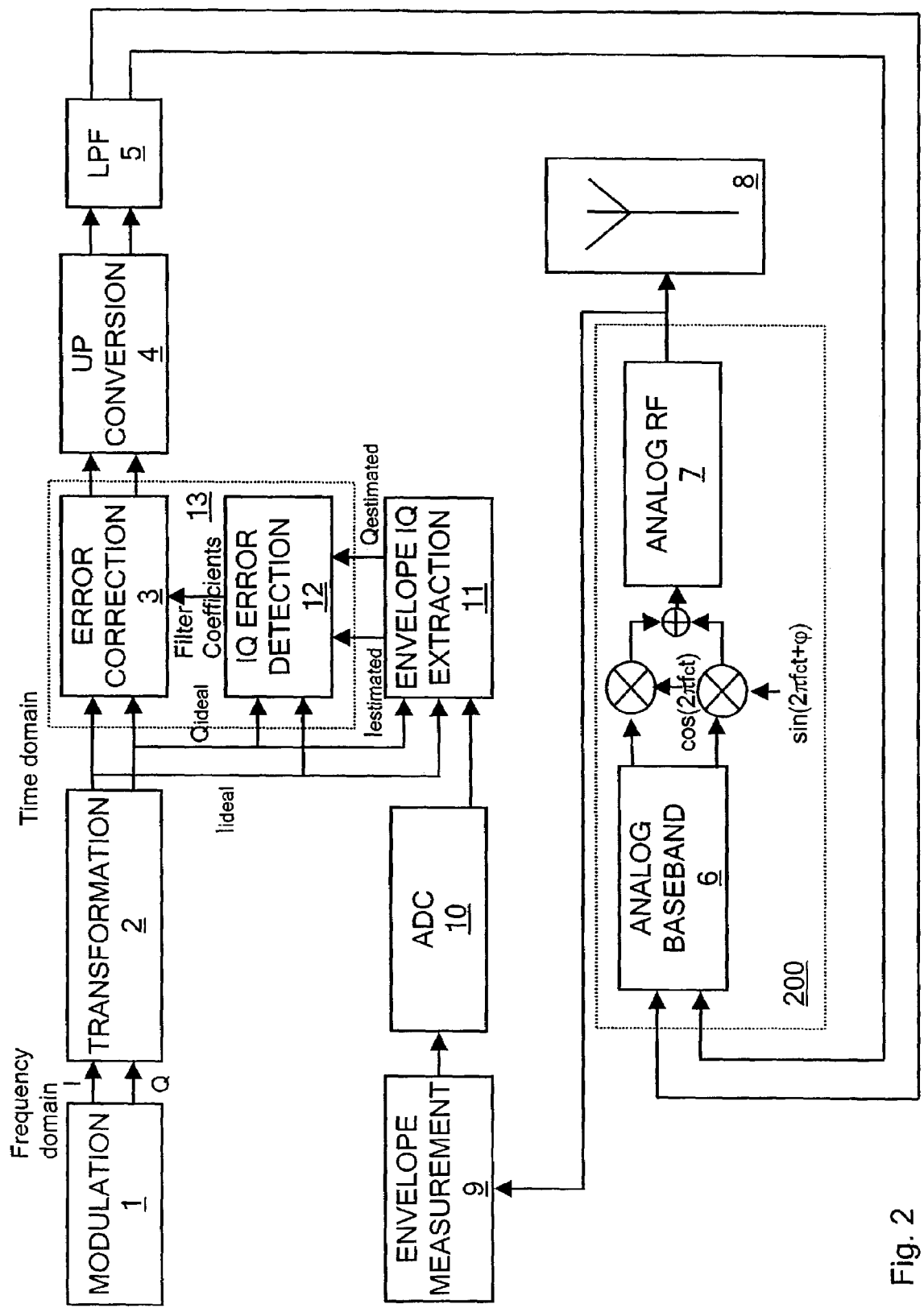
FIG. 2 shows a schematic block diagram illustrating a direct conversion architecture with analog front end and digital base band according to an embodiment of the present invention.

FIG. 2 illustrates an example of a front end for an IEEE802.11a OFDM direct conversion transmitter according to an embodiment of the invention.

According to FIG. 2, an In-phase component and a Quadrature-phase component of a digital base band signal which has been subjected to modulation in block 1 such as binary phase shift keying (BPSK), quadrature phase shift keying (QPSK) or quadrature amplitude modulation (QAM) are transformed from frequency domain to time domain in block 2, e.g. by applying an Inverse Fast Fourier Transform (IFFT) on the I- and Q-branch. The time domain IQ signal components then are fed to an error adjustment block 13 comprising an error correction block 3 and an IQ error detection block 12. By means of the error adjustment block 13 the IQ signal stream is corrected or pre-equalized such that distortions generated by non-ideal analog filter circuits of the following stages are eliminated which will be described later. From the error adjustment block 13 the pre-equalized IQ signal components are up-converted in block 4 and low-pass filtered in block 5. Then the IQ signal components are supplied to a transmitter circuitry 200, in which the signal is processed for transmission via a transmission antenna 8.

The transmitter circuitry 200 comprises an analog base band circuit 6 in which the pre-equalized IQ signal components are prepared for transmission, e.g. by applying filtering, channel coding, pulse shaping or other suitable processing operations. Then, the processed analog IQ base band signal components are supplied to an up-conversion stage comprising a modulator or multiplier to which an up-conversion signal at an adjustable range of 3.5 to 4.5 GHz is supplied from a controllable oscillator. Thereby, the analog base band IQ signal components are up-converted to an adjustable frequency range of 3.5 to 4.5 GHz. The up-converted IQ signal components are combined and fed to a filter circuit, that is an analog RF filter circuit 7 passing only the desired frequency range of the transmission signal supplied to the transmission antenna 8.

An envelope measurement circuit 9, which may be based on a clamping and/or low-pass operation or the like, provides the envelope signal of the input signal of the transmission antenna 8. This envelope signal is then supplied to an analog/digital converter circuit 10 conversion into a digital signal stream supplied to an envelope IQ extraction block 11 taken place. The envelope IQ extraction block 11 computes estimated IQ signal components out of the real signal stream which will be described later. The estimated IQ signal components are applied to the error adjustment block 13 where they are used for IQ error detection and correction which will be described later.

Next, the theoretical background of the IQ amplitude and phase imbalance error are studied. A complex analog base band signal which is output from the analog base band block 6 is a starting point:

$$S_{T,B}(t)=I(t)+j\cdot Q(t), \quad (1)$$

where subscripts S and T denote transmitter and base band, respectively. The base band signal is delivered to the analog up-converter with the carrier frequency $f_c$.

$$S_{T,fC}(t)=Re<[I(t)+j\cdot Q(t)]e^{-j2\pi f_C t}>. \quad (2)$$

This real signal can be expressed as $$S_{T,fC}=I(t)+\cos(2\pi f_C t)+Q(t)\cdot\sin(2\pi f_C t). \quad (3)$$

Ideally, the sine and cosine functions are orthogonal but, typically, the physical devices introduce a phase offset $\varphi$. This can be described by the transmitter signal $_{sTransmitter,fc,quadrature}(t)$ in equation (4). Here, the phase shift $\varphi$ is added to the sine wave.

$$S_{T,fC,q}(t)=I(t)\cdot\cos(2\pi f_C t)+Q(t)\cdot\sin(2\pi f_C t+\varphi) \quad (4)$$

A receiver down-converter provides an exactly 90° phase offset between the sine and cosine functions. Hence, the down-conversion in the receiver takes place through $$S_{R,B,q}(t)=[I(t)\cdot\cos(2\pi f_C t)+Q(t)\cdot\sin(2\pi f_C t+\varphi)]\cdot e^{+j2\pi f_c t}. \quad (5)$$

After solving the trigonometric product functions, the down converted and low-pass filtered complex base band signal is received as $$s_{R,B,q}(t) = \begin{bmatrix} I(t)\cdot\cos(0) + \dfrac{Q(t)}{2}\sin(\varphi) + \\ j\left(\dfrac{-I(t)}{2}\sin(0) + \dfrac{Q(t)}{2}\cos(\varphi)\right) \end{bmatrix}. \quad (6)$$

Besides omitting the factor ½, the first imaginary term including a sin(0)=0 can be removed, the complex base band signal including the IQ phase imbalance error of angle $\varphi$ being provided by $$S_{R,B,q}(t)=I(t)+Q(t)\cdot\sin(\varphi)+jQ(t)\cdot\cos(\varphi). \quad (7)$$

Additionally, IQ amplitude imbalance between the I branch and the Q branch of factor $\cos(\varphi)$ has been discovered.

Omitting from equation (7) the additional IQ amplitude imbalance by the factor $\cos(\varphi)$, the IQ phase imbalance error insertion can thus be expressed as $$S_{R,B,q}(t)=I(t)+Q(t)\cdot\sin(\varphi)+jQ(t). \quad (7a)$$

These IQ amplitude and IQ phase errors introduced in direct conversion analog front-end architectures, as shown in FIG. 2, have to be pre-corrected by fully digital adjustment loops. The error adjustment block 13 works on complex baseband values and needs for error detection a precise information about the transmitted imperfect analog signal.

After all imperfections are added to the analog transmitter signal, the least expensive way to feed this signal back to the digital transmitter domain is to install a measurement diode. Unfortunately the measured signal is proportional to the envelope of the signal and does not provide a complex signal, which is required for the error detection. Hence, the complex values In-phase and Quadrature-phase have to be extracted from the analog envelope signal to allow the digital adjustment algorithms the required frequency selectivity.

The algorithm of the present invention provides an analytical description how to extract from that envelope signal complex IQ base-band samples. The algorithm can be implemented as a fully digital solution and is tested with algorithms for OFDM IQ amplitude and IQ phase imbalance adjustment which will be described later.

The key is to collect two, preferably consecutive, real samples from the analog domain and the corresponding complex samples from the ideal complex domain. When comparing the real envelope samples with the ideal, original digital samples it is possible to formulate two mathematical equations with two unknown variables: the In-phase and the Quadrature-phase samples from the analog domain. After solving these two equations both I-branch and Q-branch values are available and can be forwarded to the IQ error adjustment loop.

The analog envelope may be analog-to-digital converted before the comparison process as shown in FIG. 2 so that a digital real signal from the envelope is compared with the corresponding original, ideal complex IQ signal. Moreover, the algorithm to be described subsequently also works with analog ideal complex IQ values.

Moreover, there is no dependency on certain signal frame structures, OFDM FFT length, etc. In principle, the envelope IQ extraction algorithm can be applied to single carrier systems, too.

In the following, the envelope IQ extraction method performed in block 11 is described in connection with the environment shown in FIG. 2.

The following mathematical description of the I-branch and Q-branch extraction from an OFDM transmitter envelope based signal does not account for any device transfer functions, which are in-between an envelope measurement and an ADC.

The IQ sample extraction from the envelope is necessary to drive IQ amplitude and IQ phase imbalance adjustment algorithms on the transmitter side, for example, which are described later. FIG. 2 provides a setup example for IQ error adjustment based on the envelope measurement. According to the embodiment of the invention shown in FIG. 2, the envelope IQ extraction block 11 belongs already to the digital base-band.

The envelope IQ extraction requires three different input signals. The real signal from the envelope measurement and the two corresponding signals from the IQ base band are digital signals in this embodiment. Based on these signals an estimation of the I and Q values from the analog world can be given.

For performing the estimation, the real signal and the IQ signals have to be synchronized. The synchronization of the analog envelope signal and the digital ideal IQ values can be reached by correlation. One have to store all ideal digital samples of a timing period of $t_{analog\_low} < \tau > t_{analog\_high}$ whereas $\tau$ lies in between the minimum and maximum range of the analog front end latency. In the mean the multiplication of all stored digital samples with the current analog sample indicates a correlation peak and hence provides the timing offset between the delayed digital samples and the current analog envelope value.

Figure 25:
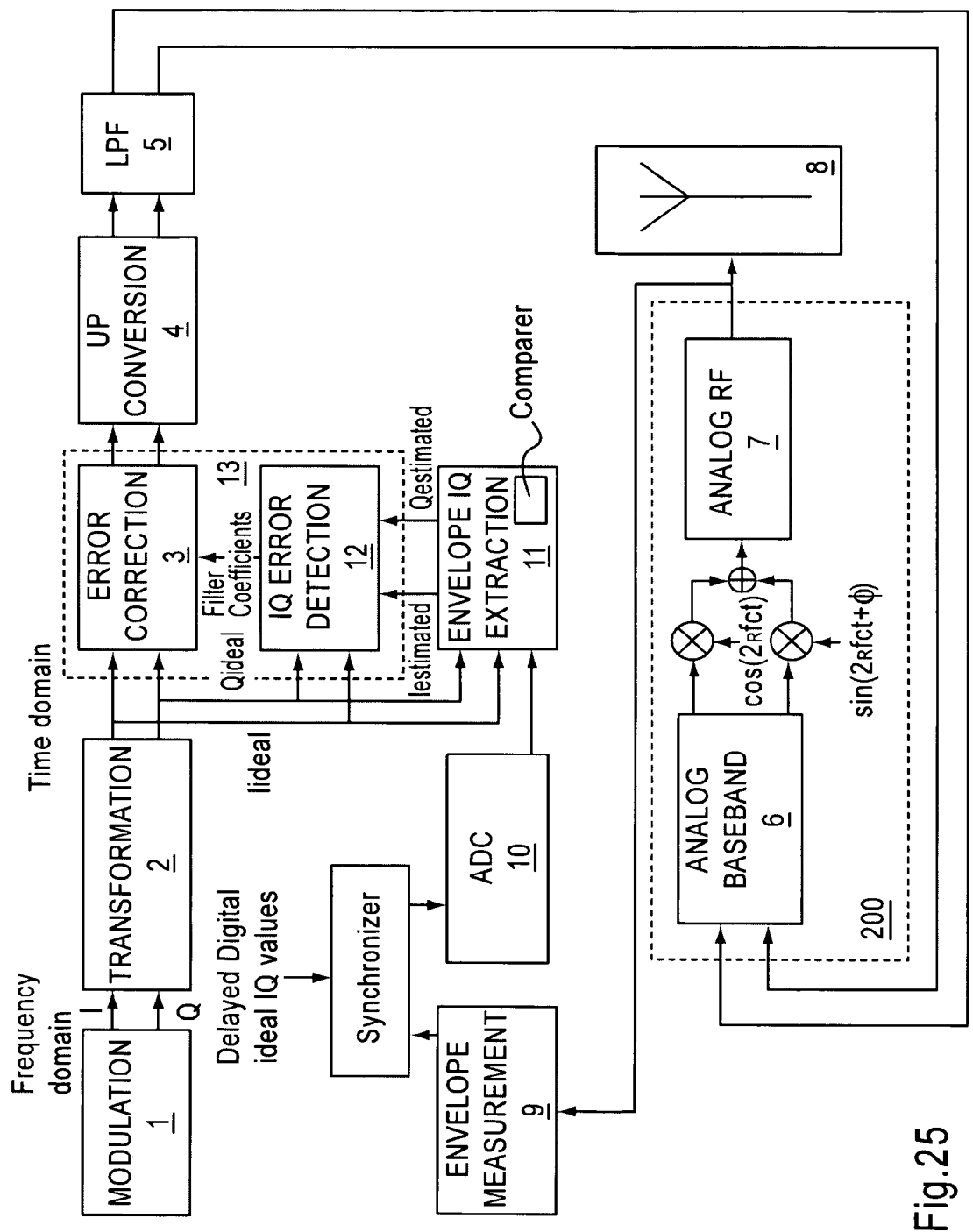
FIG. 25 shows a schematic block diagram illustrating a direct conversion architecture with analog front end and digital base band accordant to an embodiment of the present invention.

Such synchronization is not shown in FIG. 2. According to FIG. 2, it may take place before the analog-to-digital conversion. In other words, a further block may be inserted between the envelope measurement block 9 and the ADC 10, which block has as its inputs the analog envelope signal and the delayed digital ideal IQ values and outputs an analog envelope signal that is synchronized with the digital ideal IQ values input to the envelope IQ extraction block 11. (Such an embodiment is shown in FIG. 25.) Alternatively, the synchronization may be carried out after the ADC block 10 on the basis of the analog-to-digital converted real signal envelope and may be part of the envelope IQ extraction block 11, which may also, in certain embodiments, include a comparer configured to compare the synchronized real signal envelope with the synchronized original IQ signal envelope.

The correlation has to be updated every now and then because the analog system latency might change slightly over a period of time. To increase the resolution of the correlation algorithm it should work on both available clock edges in a HW implementation. Using rising and falling edges doubles the timing resolution for comparing the continuous analog signal and the discrete digital samples.

It is to be noted that the IQ extraction algorithm only works in conjunction with error compensation algorithms, which provide a convergence in the mean. In other words, IQ amplitude and IQ phase adjustment loops, for example, must have a small loop bandwidth and provide a significant low pass filter characteristic. The reason for that is that the IQ envelope extraction algorithm calculates estimates of the analog I and Q samples, i.e. I and Q samples of the real signal, and does not perform a precise analytical calculation. This is because there is no information about the signal phase in the analog domain available just by considering the envelope amplitude.

Moreover, the IQ extraction algorithm according to the present invention is assumed to work dependent upon oscillator leakage or HPA non-linearities. By inserting for all imperfections a feedback adjustment loop and optimizing all loop bandwidth relations there problem should not exist.

The digital transmitter generates the discrete, complex signal samples d(n):

$$d(n) = d_I(n) + j \cdot d_Q(n) \quad (8)$$

During the digital-to-analog conversion, base-band filtering and the up-conversion to the desired frequency band, there are added imperfections to the ideal signal as described above. Hence the discrete base-band equivalent of the imperfect transmitter output can be defined like in equation (9):

$$y(n) = y_I(n) + j \cdot y_Q(n) \quad (9)$$

But if the signal is measured at the transmitter output based on the signal envelope and not based on non-available complex values, only a real value y(n) is available:

$$y(n) = \sqrt{y^2_I(n) + y^2_Q(n)} \quad (10)$$

Hence it is not possible to extract easily the real and quadrature part of y(n). To solve this problem the following algorithm has been developed.

Equation (11), comprising equations (11a) and (11b), describes that ideally the analog and digital envelopes should be the same. This is the case if no analog imperfections exist or if all analog imperfections are already compensated.

$$|A_{ananlog}|(n) = \sqrt{y^2_I(n) + y^2_Q(n)} = |A_{digital}|(n) = \sqrt{d^2_I(n) + d^2_Q(n)} \quad (11a)$$

$$|A_{analog}|(n-1) = \sqrt{y^2_I(n-1) + y^2_Q(n-1)} = |A_{digital}|(n-1) = \sqrt{d^2_I(n-1) + d^2_Q(n-1)} \quad (11b)$$

To extract the In-phase and Quadrature-phase the relation between the analog values at time positions n and n−1 should be equal to the relation between the digital values at the time positions n and n−1.

$$y^2_I(n-1) = \frac{y^2_I(n)}{[d^2_I(n)/d^2_I(n-1)]} \quad (12a)$$

$$y^2_Q(n-1) = \frac{y^2_Q(n)}{[d^2_Q(n)/d^2_Q(n-1)]} \quad (12b)$$

After inserting equation (12) into equation (11) there are two equations two unknown parameters, $y_I^2(n)$ and $y_Q^2(n)$. The amplitudes have already measured and the digital symbols are always available.

$$A^2_{analog}(n-1) = \frac{y^2_I(n)}{[d^2_I(n)/d^2_I(n-1)]} + \frac{y^2_Q(n)}{[d^2_Q(n)/d^2_Q(n-1)]} \quad (13a)$$

$$A^2_{analog}(n) = y^2_I(n) + y^2_Q(n) \quad (13b)$$

To calculate the two unknown parameters equation (13) has to be re-formulated. Equation (13b) becomes (14a).

$$y^2_I(n) = A^2_{analog}(n) - y^2_Q(n) \quad (14a)$$

Equation (13a) is converted to equation (14b) using equation (14a).

$$y^2_Q(n) = [d^2_Q(n)/d^2_Q(n-1)] \cdot \frac{(A^2_{analog}(n-1) \cdot [d^2_I(n)/d^2 I(n-1)] - A^2_{analog}(n))}{[d^2_I(n)/d^2_I(n-1)] - [d^2_Q(n)/d^2_Q(n-1)]} \quad (14b)$$

It is assumed that the analog component imperfections do not change sign of most analog samples. Then it is possible to reuse the sign of the digital sample for the corresponding analog value. Even though several signs will be wrong, low pass filtering by the following error detection algorithm eliminates these inaccuracies. Finally the desired recovered IQ samples can be described via equation (15).

$$y_I(n) = \sqrt{y^2 I(n)} \cdot \operatorname{signum}(d_I(n)) \quad (15a)$$

$$y_Q(n) = \sqrt{y^2 Q(n)} \cdot \operatorname{signum}(d_Q(n)) \quad (15b)$$

Figure 3:
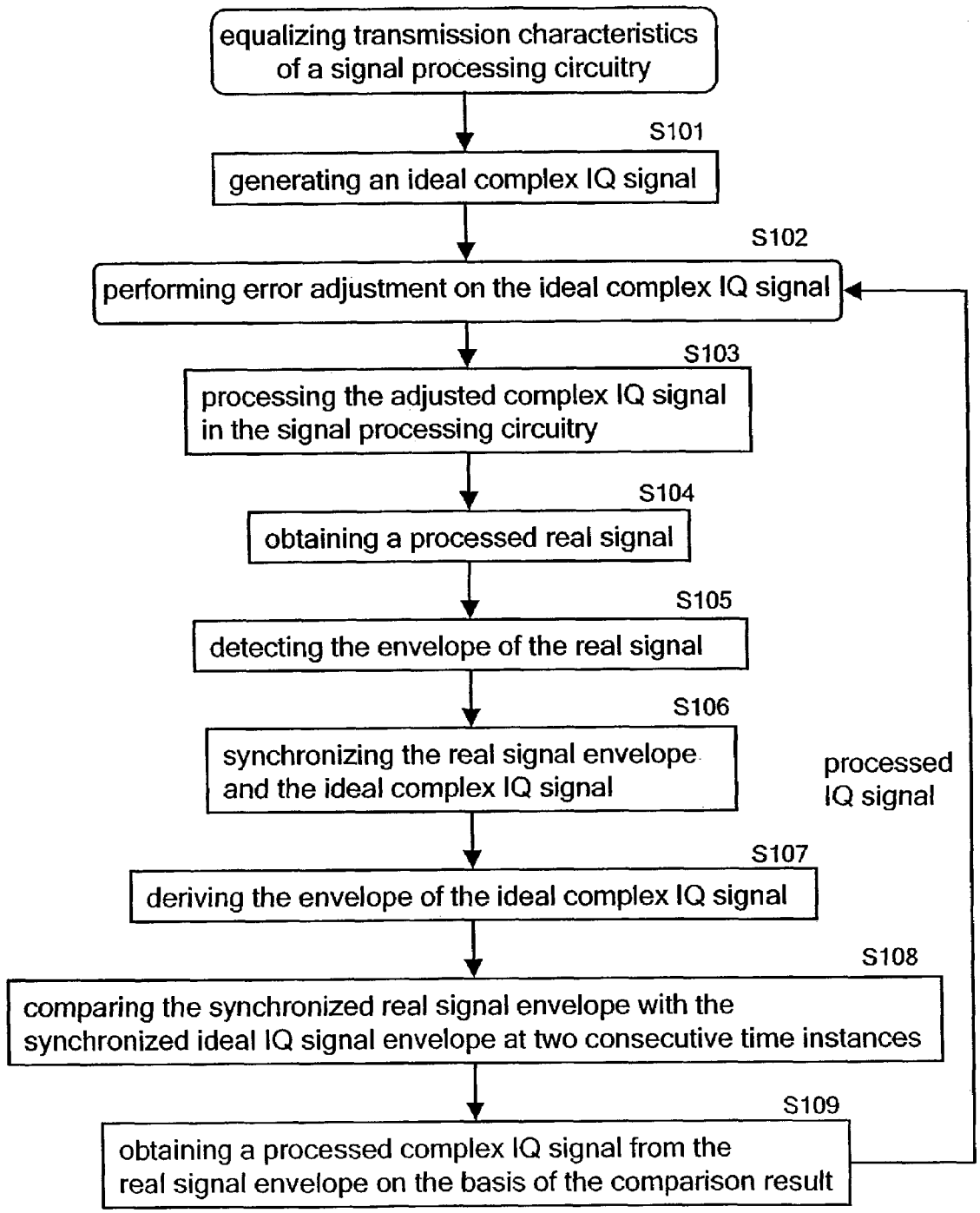
FIG. 3 shows a flow chart illustrating an error adjustment method according to the present invention.

FIG. 3 shows a flow chart of an error adjustment method of equalizing transmission characteristics of a signal processing circuitry such as the signal processing circuitry 200 which method comprises an envelope IQ extraction process which is based on the above-described algorithm. In step S101, an ideal complex IQ signal $I_{ideal}$, $Q_{ideal}$ is generated, on which error adjustment is performed in step S102. Then, in step S103, the adjusted complex IQ signal is processed in the signal processing circuitry 200, thereby obtaining a processed real signal in step 104. In step S105, the envelope of the real signal is detected and, in step S106, this real signal envelope and the ideal complex IQ signal are synchronized. In step S107, the envelope of the ideal complex IQ signal is derived and the synchronized real signal envelope is compared with the synchronized ideal IQ signal envelope at two consecutive time instances in step S108. Finally, in step S109, a processed complex IQ signal $I_{estimated}$, $Q_{estimated}$ is obtained from the real signal envelope on the basis of the comparison result, which processed complex IQ signal is used in the step S102 of performing error adjustment.

In the foregoing, the estimation of possible analog I and Q values without an explicit demodulation process is described.

It is noted that several estimates will be inaccurate or wrong, because for example the sign of the symbols has been estimated wrongly or non-linearities might introduce significant imperfections.

Equations (14a) and (14b) give an estimate of possible analog IQ samples whereas these estimates might be wrong IQ values. Hence this IQ extraction algorithm should operate together with error adjustment algorithms, which are tolerant against certain inaccuracies.

Hence a combination of IQ amplitude and IQ phase imbalance adjustment algorithms, for example, can handle these imperfect detected IQ estimates which are described in the following. They are stochastic gradient algorithms regarding the expectation of certain errors and hence provide low pass filtering to the error information intensively.

In addition, as one can see from the equations, there are significant possibilities of having a division by zero. Hence there are for all divisions some requests inserted to the algorithm, whether the division result does exceed certain limits. This is for guaranteeing the algorithmic stability in case of values like denominator=0, etc. In principle these are non-linear clipping functions for each of the preliminary results. If the result does exceed certain limits, the final IQ estimate is 0 and there will be given a false flag to the following algorithm, not to care about this result.

In the following, error adjustment algorithms are described which may use the estimated IQ values $y_I(n)$ and $y_Q(n)$ provided by the envelope IQ extraction block 11. In this respect reference is made to PCT/IB02/02775 and PCT/FI/F02/00737 patent applications for the disclosure of which is incorporated herein by reference.

Figure 4:
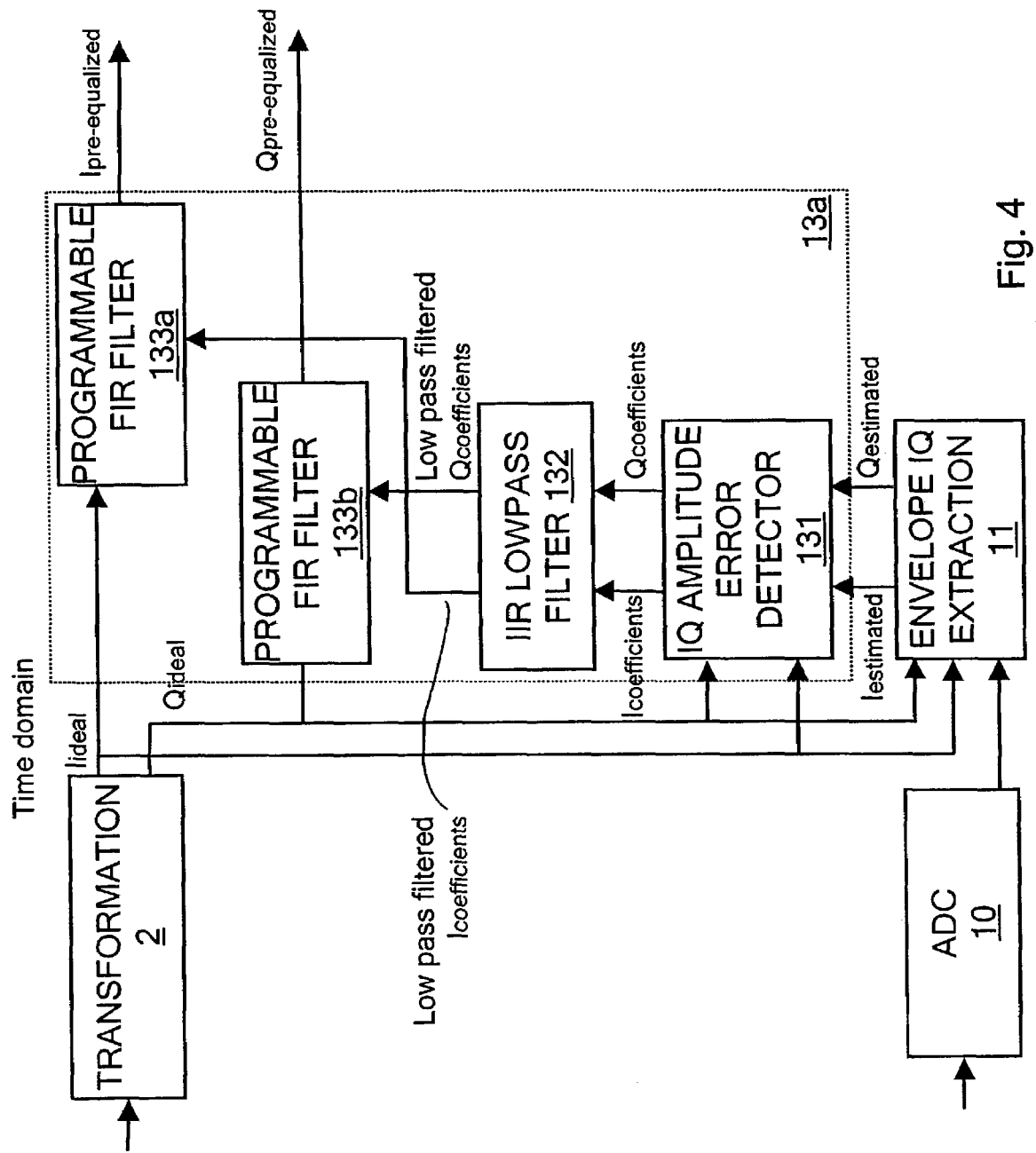
FIG. 4 shows a schematic block diagram illustrating an error adjustment block according to an embodiment of the invention.

FIG. 4 shows a schematic block diagram of part of the wireless LAN analog front end according to FIG. 2. In FIG. 4, the error adjustment block 13a comprises an IQ amplitude error detector block 131 to which the estimated IQ values $y_I(n)$ and $y_Q(n)$, that is $I_{estimated}$ and $Q_{estimated}$, are supplied from the envelope IQ extraction block 11. In addition, the amplitude error detector block 131 has inputs $I_{ideal}$ and $Q_{ideal}$ supplying ideal IQ values directly from the transformation block 2 which ideal IQ values are synchronized with the estimated IQ values as already described above with respect to the envelope IQ extraction method. From the estimated IQ values and the ideal IQ values the IQ amplitude error detector block 131 calculates a number of non-complex coefficients $I_{Coefficients}$ for the I-branch and a number of non-complex coefficients $Q_{Coefficients}$ for the Q-branch. The output of the IQ amplitude error detector block comprises as many wires as the number of coefficients chosen.

The coefficients for the I- and Q-branch, respectively, are fed to an IIR low pass filter 132 which outputs low pass filtered coefficients for the I- and Q-branch, respectively, to provide a significant low pass filter characteristic. The low pass filtered I coefficients are supplied to a programmable FIR filter 133a arranged in the ideal I-branch and forming an adaptive filter pre-equalizer. The low pass filtered Q coefficients are supplied to a programmable FIR filter 133b located in the ideal Q-branch and forming an adaptive filter pre-equalizer. The programmable FIR filters 133a, 133b function to correct or pre-equalize the ideal IQ branches.

In the following a method for computing the I and Q coefficients for the respective programmable FIR filter is described.

At the IQ amplitude error detector block 131 the estimated IQ values are compared with the ideal IQ values output from the transformation block 2 to calculate or derive error values $e_I[k]$ and $e_Q[k]$.

Based on the obtained error values $e_I[k]$ and $e_Q[k]$, a predetermined number of control values, e.g. filter coefficients $I_{coefficients}$, $Q_{coefficients}$, is derived and supplied to the respective adaptive pre-equalizer 133a, 133b to thereby control the equalizing characteristic. Before being input in the respective adaptive pre-equalizer 133a, 133b, the I- Q-coefficients may be passed through an IIR low pass filter 132. Thus, distortions, such as IQ amplitude imbalance, caused by the non-ideal transmitter filters can be measured at the IQ amplitude error detector block 131 so as to adaptively control the pre-equalizing function. Accordingly, an adaptive decision-aided pre-equalization scheme is provided in the digital domain.

According to FIGS. 2 and 4, the error adjustment block 13 is put in front of the non-ideal analog filters or channel and hence includes the analog filters or channel in its feedback loop. Therefore, the calculation of the optimal coefficient vector is based on two unknown variables or vectors, the analog filter transfer characteristic or vector and the optimal coefficient set of the adaptive pre-equalizer.

Figure 5:
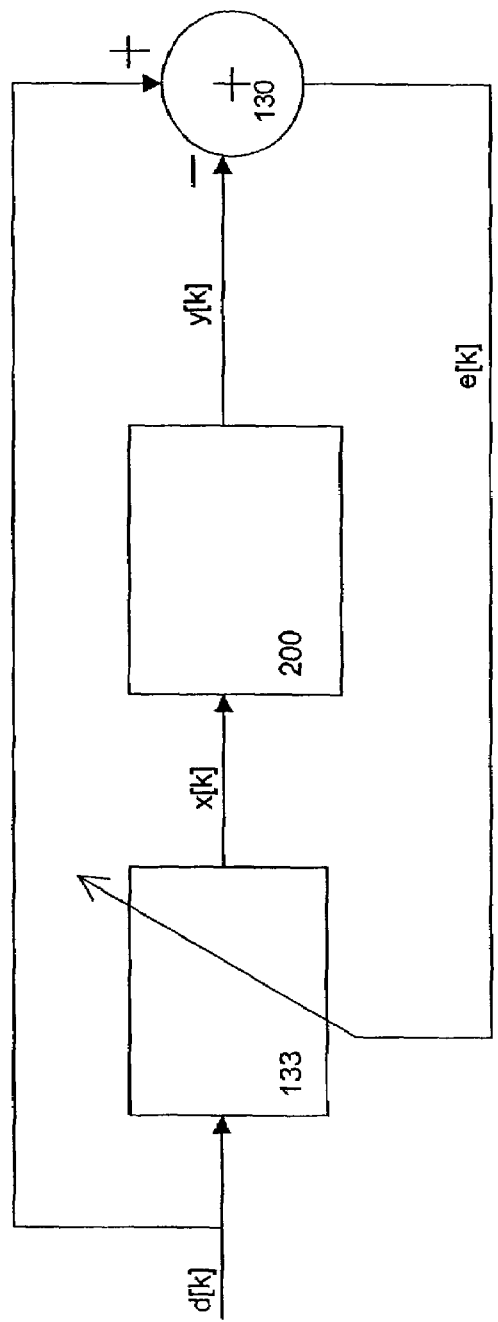
FIG. 5 shows a schematic block diagram illustrating an adaptive pre-equalization setup.

FIG. 5 shows a corresponding adaptive pre-equalization setup in which only one programmable FIR filter or adaptive pre-equalizer 133 is shown. It is to be understood that the arrangement of FIG. 4 is applied to both pre-equalizers 133a and 133b. In the following, the structure of pre-equalizer 133 is described generally for the pre-equalizers 133a and 133b. According to FIG. 4, the adaptive pre-equalizer 133 generates an input signal x[k] for the transmitter circuitry 200 (for the sake of simplicity the up-conversion block 4 and the LPF 5 are not shown in FIG. 4), wherein the output signal y[k] of the transmitter circuitry 200 is supplied to a subtractor or comparison circuitry 130 to which the input data signal d[k], i.e. the ideal I or Q values, is also supplied in order to obtain the error value e[k] based on which the pre-equalizer 133 is controlled. In FIG. 4, the comparison circuitry is formed by the IQ amplitude error detector 131.

The pre-equalization approach shown in FIG. 5 can be described based on the following equations:

$$x[k]=\underline{d}^T[k]\cdot\underline{w}[k] \tag{16}$$

$$y[k]=\underline{x}^T[k]\cdot\underline{h}[k] \tag{17}$$

In the above equations (16) and (17), $\underline{w}[k]$ denotes the coefficient or weight vector of the pre-equalizer 133, and $\underline{h}[k]$ denotes the transfer vector of the transmission circuitry 200.

Based on the above two equations (16) and (17), the error value e[k] can be obtained based on following equation.

$$e[k]=d[k]-y[k]=d[k]-\underline{x}^T[k]\cdot\underline{h}[k] \tag{18}$$

Inserting equation (16) to equation (18) results in the equation:

$$e[k]=d[k]-(\underline{D}^T[k]\cdot\underline{w}[k])^T\cdot\underline{h}[k] \tag{19}$$

According to the present invention, the above equation (19) with its two unknown vectors can be solved based on an approximation and a single adaptation processing. The approximation can be performed for a gradient vector of the error value e[k]. In particular, a least mean square (LMS) gradient vector can be determined. The starting point for the determination of the gradient approximation is the above equation (19). The following equation describes a system cost function $J\{\underline{w}[k]\}$ used for the gradient approximation:

$$J\{\underline{w}[k]\}=E<e^2[k]>=E<(d[k]-y[k])^2>=E<(d[k]-\underline{w}^T[k]\cdot\underline{D}[k]\cdot\underline{h}[k])^2> \tag{20}$$

Consequently, the gradient vector of the error performance function can be obtained on the basis of a partial differentiation of the above system cost function. This leads to the following equation:

$$\nabla\{E<e^2[k]>\} = -2 \cdot E<\underline{e}[k] \cdot \underline{x}^\sim[k]> \quad (21)$$

wherein $\underline{x}^\sim[k]$ denotes a direction vector of the gradient, which corresponds to an assessment of the data matrix $\underline{D}[k]$ with the transfer vector $\underline{h}[k]$ of the transmitter circuitry 200. This can be described on the basis of the following equation:

$$\underline{x}^\sim[k] = \underline{D}[k] \cdot \underline{h}[k] = h_\tau \cdot \underline{d}[k-\tau] = \underline{d}[k-\tau] \quad (22)$$

wherein the data matrix $\underline{D}[k]$ represents a transformation matrix, which rotates the non-ideal transfer vector $\underline{h}[k]$ of the transmitter circuitry 200, $h_\tau$ provides the approximated analog filter transfer value, e.g. $h_\tau=1$ (while all-other coefficients of the transfer vector are set to "0").

Figure 6:
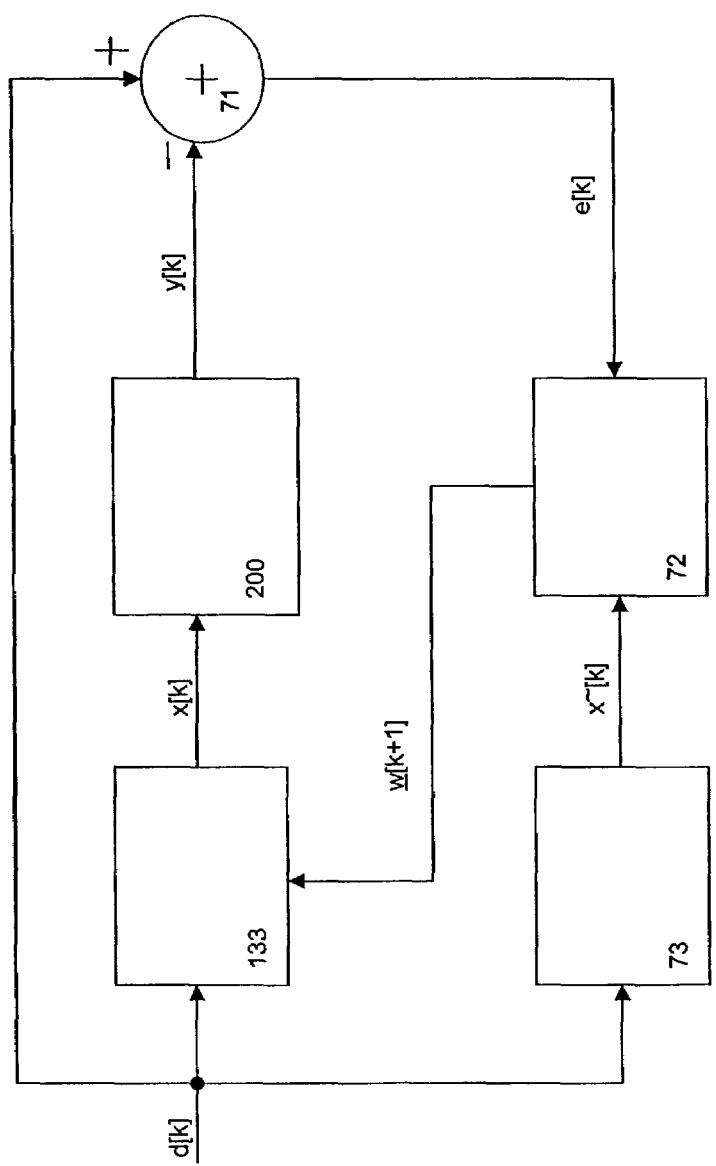
FIG. 6 shows a pre-equalization scheme.

FIG. 6 shows an implementation example of the IQ amplitude error detector block in FIG. 4 based on the adaptive pre-equalization setup scheme of FIG. 5. For the sake of simplicity, the envelope measurement block 9, the ADC 10 and the envelope IQ extraction block 11 are omitted in FIG. 6, so that the output value y[k] of the transmitter circuitry 200 corresponds to the digitized IQ estimation values output from the envelope IQ extraction block 11.

In FIG. 6, the output signal y[k] is supplied to a subtraction circuit 71 which generates the error value e[k]. This error value e[k] is supplied to an adaptation circuit 72 arranged to determine an updated or new coefficient vector $\underline{w}[k+1]$ for controlling the pre-equalizer 133. Furthermore, an approximation circuit 73 is provided for approximating the transfer characteristic or transfer vector $\underline{h}[k]$ of the transmitter circuitry 200. Accordingly, the output signal of the approximation circuit 73 corresponds to the above signal vector $\underline{x}^\sim[k]$. In view of the fact that the transfer vector $\underline{h}[k]$ is approximated in the approximation circuit 73, only one unknown variable has to be determined in the adaptation circuit 72.

In the following, the derivation of the pre-equalization coefficient vector $\underline{w}[k+1]$ is described. The signal vector $\underline{x}^\sim[k]$ can be obtained by implementing a copy of the analog filter characteristic of the transmitter circuitry 200 in the approximation circuit 73. However, this would also require an identification process of this analog filter characteristic. As an advantageous simplified solution, the approximation circuit 73 may implement the filter characteristic of the transmitter circuitry 200 as a simple delay block or function. Then, the required delay value corresponds to the analog filter delay τ, that is the position of the maximum filter peak of the analog filter characteristic of the transmitter circuitry 200. This maximum peak can then be replaced by a value "1" in the transfer vector $\underline{h}[k]$, while the other vector components can be set to "0". The analog filter characteristic of the transmitter circuitry 200 can thus be approximated by a simple FIR (Finite Impulse Response) filter with estimated coefficient $\underline{h}_\tau[k]="1"$ and all other coefficients set to "0".

This approximation leads to a simplification of the above equation (20), as follows:

$$\nabla\{E^\#<e^2[k]>\} = -2 \cdot e[k] \cdot \underline{d}[k-\tau] \quad (22)$$

Based on the simplified equation (22), the coefficients of the pre-equalizer 133 can be updated on the basis of the following equation:

$$\underline{w}[k+1] = \underline{w}[k] + \mu \cdot e[k] \cdot \underline{d}[k-\tau] \quad (23)$$

Using the above approximation, a straight forward calculation or determination of the coefficients of the adaptive pre-equalizer 133 is possible in the adaptation circuit 72.

In the following, a more general flow of the steps of the above adaptive pre-equalization scheme according to the invention is described.

In a first step, a difference between the output signal y[k] of the equalized circuitry, i.e. the transmission circuitry 200, and the input signal d[k] of the equalizing function of the pre-equalizer 133 is determined. This difference corresponds to the error value e[k] and may be based on a comparison of the signal envelopes as explained earlier. However, any other signal parameter can be used for obtaining the difference. Then, the transmission characteristic of the equalized circuitry is approximated. Here, any approximation can be applied so as to derive one of the two unknown variables in equation (19). Then, the input signal of the equalizing function is assessed with the approximated transmission characteristic. Based on the determined difference and the assessed input signal, a gradient of the difference is approximated e.g. based on equation (23). Having derived the gradient of the difference, the control values or coefficients of the pre-equalizing function are updated based on the approximated gradient.

In the foregoing, a proposal for an adaptive pre-equalization approach has been described which may be used for compensating amplitude imperfections, for example in-phase (I) and quadrature phase (Q) amplitude imperfections, for direct conversion architectures as shown in FIG. 2. In general, the adaptive pre-equalization approach may be used e.g. for an analog filter characteristic of a transmitter circuitry or any other signal processing circuitry. The equalization is based on an approximation, for example an LMS approximation, and does not require a system identification process with respect to the analog filter characteristic, but approximates this characteristic by a simple delay block or any simplified transfer characteristic. Thereby, a highly flexible approach is provided, since variations in the characteristic of the transmitter circuitry 200 do not have to be taken into account. In fact, imperfections are learned, a model is made, and the model is used in pre-equalizing the signal before applying it to the transmitter chain. Thereby, even changes in the transmitted signal wave form due to transmitter imperfections can be compensated. The invention gives the freedom to accept or promote tighter specifications with respect to the magnitude of the error value or vector in future standards. Furthermore, multipath delay spread tolerance can be improved by reducing intersymbol interference (ISI) which results from group delay equalization. The adaptive low-complexity function of the invention suites very well to volume production which needs larger tolerances in the specifications. This may lead to an improved production yield.

It is noted that the above described adaptive pre-equalizer 133 and the IQ amplitude error detector 131 together with the envelope IQ extraction block 11 are not restricted to the arrangement of FIG. 2 but can be used in any signal processing circuitry for reducing signal distortions. The comparison can be performed for any signal parameter suitable to obtain a difference caused by distortions of the signal processing circuitry. The transfer characteristic of the signal processing circuitry can be approximated by any suitable approximation. Similarly, the control values for controlling the pre-equalizer may be obtained by any suitable approximation for obtaining a gradient of the difference value or error value.

Next, an IQ phase imbalance adjustment algorithm performed in the error adjustment block 13 of FIG. 2 is described.

Figure 7:
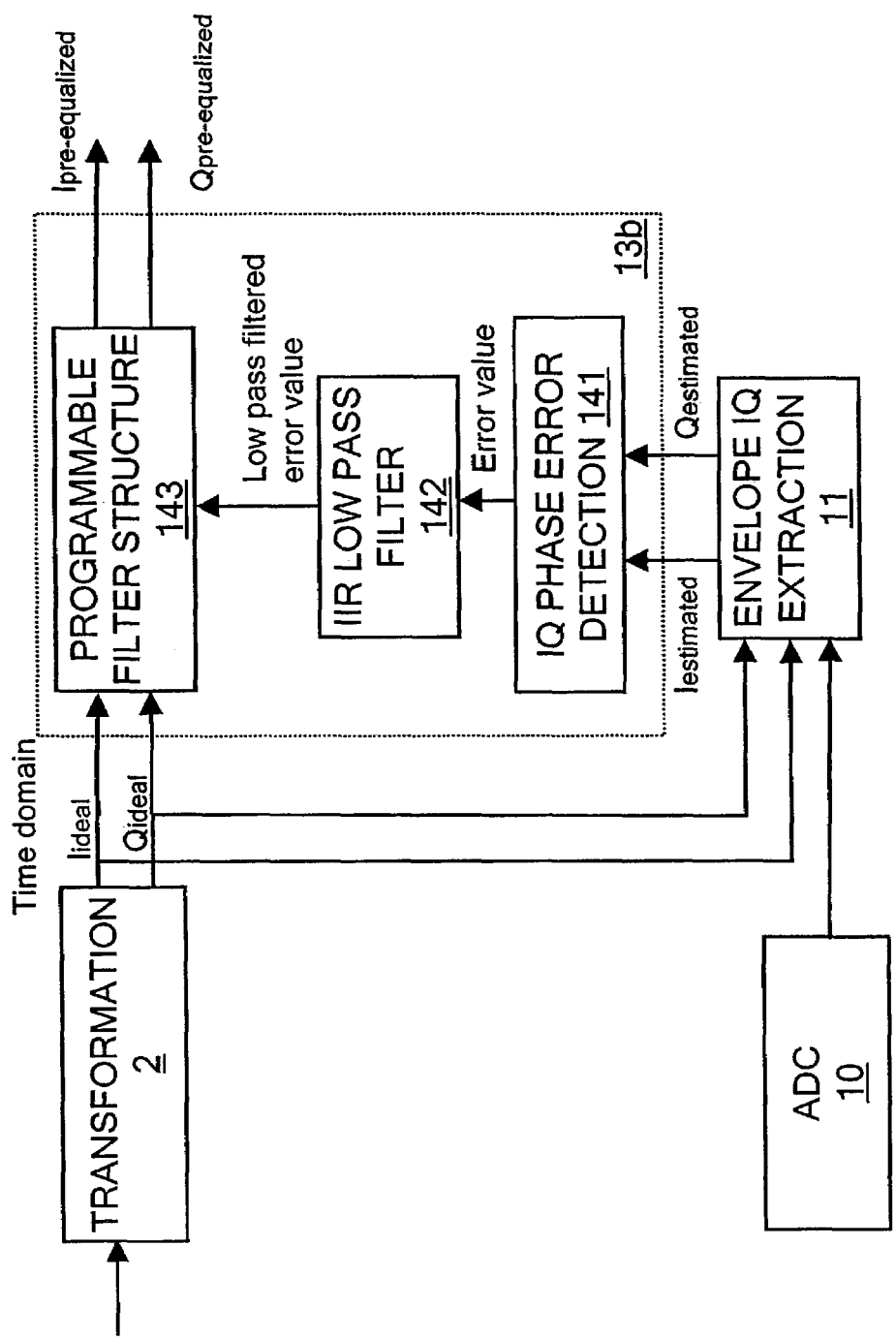
FIG. 7 shows a schematic block diagram illustrating an error adjustment block according to another embodiment of the invention.

FIG. 7 shows part of the direct conversion analog front end architecture of FIG. 2 with the error adjustment block 13b being formed by an IQ phase error detection block 141, an IIR low pass filter block 142 and a programmable filter structure block 143 which outputs pre-equalized IQ values. The phase error detection block 141 uses the estimated IQ values output from the envelope IQ extraction block 11 for computing an error value to be used for programming the programmable filter structure 143. Before supplying the error value to the filter structure 143, it is low pass filtered in block 142 to provide a significant low pass filter characteristic.

First, non-frequency selective blind IQ phase imbalance adjustment as a background is considered. First, error detection is performed combined with a low-pass filtering of the calculated error value. The IQ data stream is then accessed to correct the incoming samples. The system may be installed as a feedback loop system. The incoming IQ samples are corrected first. The remaining error is then calculated and low-pass filtered. When the whole IQ phase imbalance error is compensated for, the loop remains in equilibrium.

The digital blind error detector applies the following mathematical considerations. If the estimated I and Q branch samples output from the envelope IQ extraction block 11 are statistically independent, the expectation of their product equals zero:

$$E\{I[n]\cdot Q[n]\}=0. \quad (24)$$

In such a case, the adjustment block executes no corrections at all. But if there is an IQ phase imbalance error, inserted equation (24) has to be rewritten on the basis of equation (7a):

$$E\{(I[n]+Q[n]\sin(\phi))\cdot Q[n]\}=$$
$$E\{I[n]\cdot Q[n]\}+E\{Q[n]\sin(\phi)\cdot Q[n]\}= \quad (25)$$
$$E\{Q^2[n]\sin(\phi)\}=$$
$$E\{Q^2[n]\}\sin(\phi)=\sigma_Q^2\cdot\sin(\phi)\approx\sin(\phi)$$

The first addend in the second line of equation (25) equals equation (24) and results in zero. The remaining expectation value will be proportional to the error value $\sin(\phi)$. The expectation of the factor $Q^2[n]$ provides the Q branch with mean power and can be interpreted as an amplification factor, because it always has a positive sign. This result is used to correct the incoming signal stream.

To correct the IQ imbalance error the product of the IQ samples has to be calculated:

$$e[n]=I[n]\cdot Q[n]. \quad (26)$$

The expectation value respectively the correction coefficient can then be provided by the integrator:

$$c[n] = \mu \int_{1=0}^{n} e-[i] \quad (27)$$

The input to the integrator can be multiplied by an additional constant $\mu$ defining the adaptation speed respectively the loop bandwidth. Next, the error value e[n] is low-pass filtered to a coefficient value $c[n-1]=-\sin(\phi)$. This coefficient is multiplied with the incoming Q branch sample stream. Finally, this product is subtracted from the I' branch samples. I'[n] contains phase imbalance I[n] values. The mathematical description of the IQ phase imbalance correction block is $$I'[n+1]-c[n]\cdot Q[n+1]=I[n+1] \quad (28)$$

Next, let us study an embodiment of the invention where frequency selective IQ phase imbalance adjustment is carried out. It is assumed that one or both of the analog base band filters provide imperfections depending on their time domain impulse response respectively on their frequency transfer function. These imperfections could be one or more items, such as amplitude ripple, non-linear filter phase behaviour or filter ISI. Because of these imperfections, the above described non-frequency selective adjustment loop locks to a wrong error value. It is therefore necessary to implement an IQ phase imbalance error detector which is frequency selective and capable of covering analog filter imperfection afflicted $\tilde{I}$ and $\tilde{Q}$ symbols. The following equation illustrates the mathematical operations:

$$e_i[n]=\tilde{I}[n-(N-1)/2]\cdot\tilde{Q}[n-(i-1)], i=1,2,\ldots,N \quad (29)$$

where N is an odd number and the index of the error value is valid from 1 to N. N is selected on the basis of the analog filters. In practical cases in a WLAN environment, N typically has a value ranging from 7 to 19, but also other values may apply. The larger the value, the better the error value can be removed, at the cost of implementation difficulties.

Let us study a numerical example when N=5. In such a case equation (29) has the form $$e_i[n]=\tilde{I}[n-(5-1)/2]\cdot\tilde{Q}[n-(i-1)]=\tilde{I}[n-2]\cdot\tilde{Q}[n-(i-1)].$$

Error values can thus be defined as $$e_1[n]=\tilde{I}[n-2]\cdot\tilde{Q}[n]$$
$$e_2[n]=\tilde{I}[n-2]\cdot\tilde{Q}[n-1]$$
$$e_3[n]=\tilde{I}[n-2]\cdot\tilde{Q}[n-2]$$
$$e_4[n]=\tilde{I}[n-2]\cdot\tilde{Q}[n-3]$$
$$e_5[n]=\tilde{I}[n-2]\cdot\tilde{Q}[n-4]$$

Figure 8:
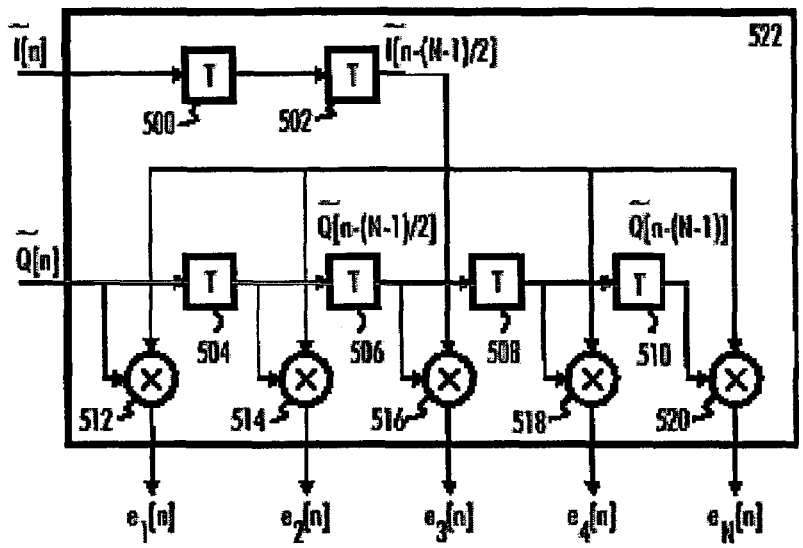
FIG. 8 shows an example of a frequency selective IQ error detector.

A possible implementation of the frequency selective IQ error detector disclosed above is illustrated in FIG. 8 (block 141 in FIG. 7 corresponds to the frequency selective IQ error detector). The lengths of the tap delay lines are determined by N. The implementation is thus a tap delay line 522 with two delay elements 500, 502 in the I branch and four delay elements 504 to 510 in the Q branch. The center tap (N−1)/2 of the I branch is multiplied with N different values from the Q branch in multipliers 512 to 520.

Returning to the general case, each error value $e_i[n]$ is low-pass filtered by its own integrator:

$$c_i[n] = \mu \int_{k=0}^{n} e_i[k], i = 1, 2, \ldots, N \quad (30)$$

Figure 9:
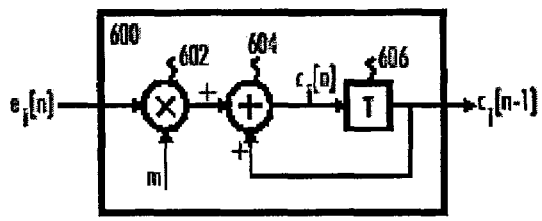
FIG. 9 shows an example of an integrator.

A possible implementation of one integrator is illustrated in FIG. 9. An integrator 600 comprises a multiplier 602, an adder 604 and a delay element 606, after which the signal is fed back to the adder 602. Block 142 in FIG. 7 corresponds to the error value integrators.

The IQ imbalance correction can be performed according to the equation $$\tilde{I}[n-(N-1)/2] = \begin{bmatrix} \tilde{I}'[n-(N-1)/2] - \\ \sum_{i=1}^{N} c_i[n-m]\cdot\tilde{Q}[n-(i-1)] \end{bmatrix}, \quad (31)$$

$$i = 1, 2, \ldots, N \text{ and } m > 0$$

Figure 10:
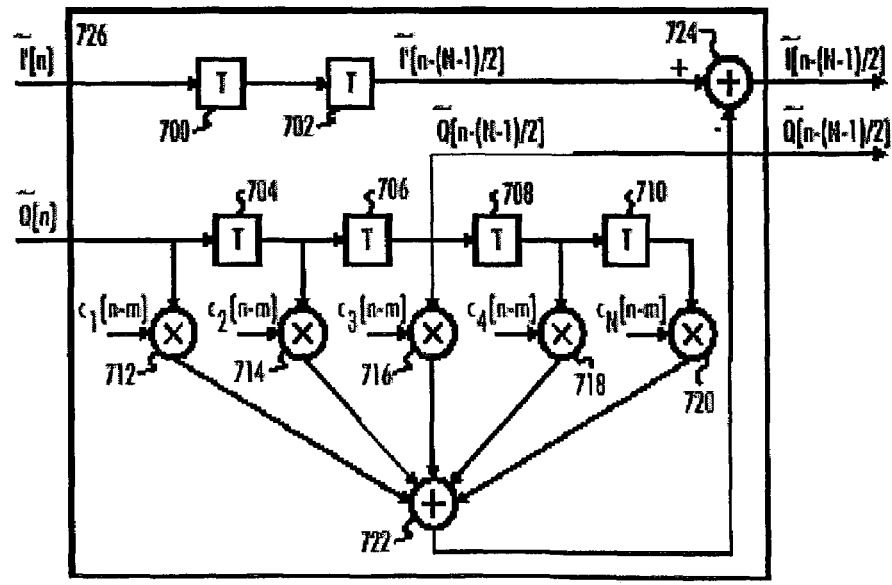
FIG. 10 shows an example of a frequency selective IQ error corrector.

Here, the variable m describes the implemented loop latency, which arises from the additional delay present in real implementation in hardware or digital signal processing software. A possible implementation of the IQ phase imbalance adjustment algorithm is illustrated in FIG. 10, assuming again that N=5. As in the error detector, in a tap delay line 726 the I branch comprises two delay elements 700, 702, and the Q branch four delay elements 704 to 710. As in the case of a channel equalizer, the Q branch values from the tap-delay line are multiplied by the corresponding correction coefficients $c_i$ in multipliers 712 to 720 and summed up in an adder 722. This result is subtracted from the imperfect I' branch centre tap in adder 724.

The error correction and error detection blocks may be realized in a transmitter using a software programmed processor, DSP (Digital Signal Processing) or discrete circuits.

As described above, in the IQ phase error detection block 141 in FIG. 7 a frequency selective IQ phase error estimation is performed. In block 143, the digitized signal is corrected with frequency selective correction factors based on the error estimation.

To be precise, in the IQ phase imbalance adjustment or adaptive IQ phase equalizer block 13b of FIG. 7 an IQ phase imbalance error is determined from the digitised signal with a first tap delay line. Then, correction terms are calculated on the basis of the determined error and coefficients of a second tap delay line are determined on the basis of the correction terms. Finally, the phase imbalance is corrected from the digitised signal with a second tap delay line.

Figure 11:
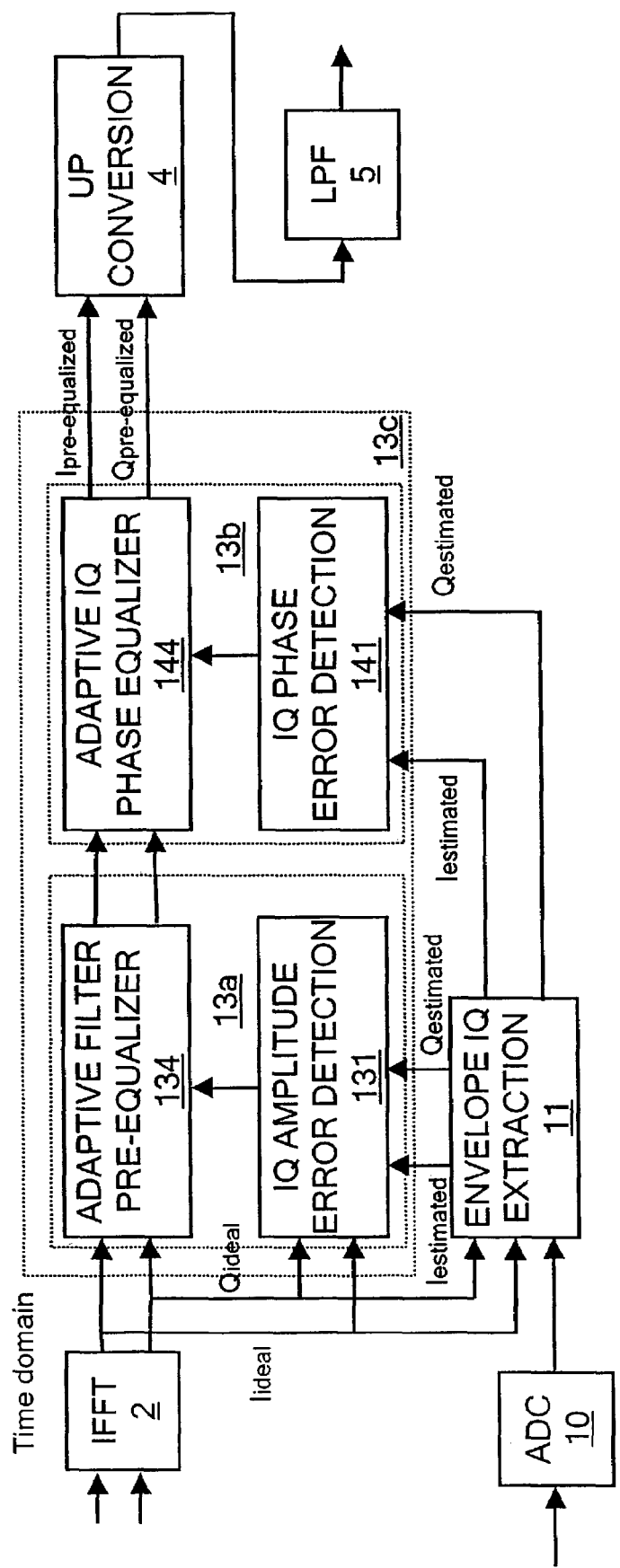
FIG. 11 shows part of the direct conversion architecture of FIG. 2 comprising an error adjustment block according to a preferred embodiment of the invention.

FIG. 11 shows part of the direct conversion analog front end architecture of FIG. 2 which part illustrates a preferred embodiment of the present invention. According to the preferred embodiment, the IQ error adjustment block 13c comprises both an adaptive filter pre-equalizer 134 with the IQ amplitude error detection block 131 according to block 13a and an adaptive IQ phase equalizer 144 with the IQ phase error detection block 141 according to block 13b.

As can be seen from FIG. 11, first the frequency selective IQ amplitude imbalance adjustment and after that the non-decision aided IQ phase imbalance adjustment are installed. Both algorithms operate in the transmitter time domain. After both adjustment operations have been done the digital low-pass filter 5 is installed. Hence this digital filter guarantees that the spectrum mask will not be influenced. Besides that, the error signal for the adaptive pre-equalizers 134, 144 are band-limited and hence the correction will also take place only in the desired bandwidth. It is to be noted that the order of the amplitude imbalance adjustment and the phase imbalance adjustment may be exchanged so that first the non-decision aided IQ phase imbalance adjustment and after that the frequency selective IQ amplitude imbalance adjustment is installed.

The amplitude pre-equalizer does not use complex coefficients but two independent adaptive FIR filters with independent real coefficients. The algorithm is based on an approximated LMS equalizer, works decision aided. This enables a frequency selective handling of IQ amplitude errors and analog filter equalization or miss matching.

After the amplitude pre-equalizer algorithm the IQ phase imbalance adjustment algorithm is installed which works non-decision aided. Hence, this algorithm is robust but needs a longer acquisition time than the filter pre-equalizer.

Both algorithms require clear information about the In-phase and Quadrature-phase samples from the analog high frequency domain. As described above, the envelope IQ extraction block 11 recovers from an envelope based OFDM signal the I- and Q-branch samples in a stable way.

In case one or both equalizer loops become unstable, the loop bandwidth has to be increased or, in other words, the loop adaptation speed has to be reduced. Hence, over a longer period of time, inaccurate IQ extraction estimates are reduced compared to the number of good IQ estimates.

By installing inexpensive and non-precise devices to an OFDM direct conversion analog front-end, there are inserted additional signal imperfections. Two imperfections, the IQ phase and IQ amplitude imbalance effects, have a frequency dependency caused through the analog filters.

According to the preferred embodiment, three fully digital algorithms are implemented to handle three imperfections individually in an OFDM direct conversion transmitter:
Frequency selective IQ phase imbalance adjustment
Frequency selective IQ amplitude imbalance adjustment
Analog filter equalization respectively analog base-band filter miss-matching Additionally the preferred embodiment incorporates the IQ symbol extraction from the analog envelope.

The preferred embodiment presents a proper architecture to solve simultaneously the IQ imperfections for direct conversion front-ends.

The present invention may be implemented in an ASIC or a DSP processor software code. Additionally, the present invention may be implemented with very small changes in any single carrier quadrature direct conversion transmitter.

In the following, simulation results are presented.

First of all no IQ phase and IQ amplitude imbalance errors are inserted. Only analog filter imperfections are visible. Both filters are not matched and they insert ISI in the OFDM time domain.

Figure 1:
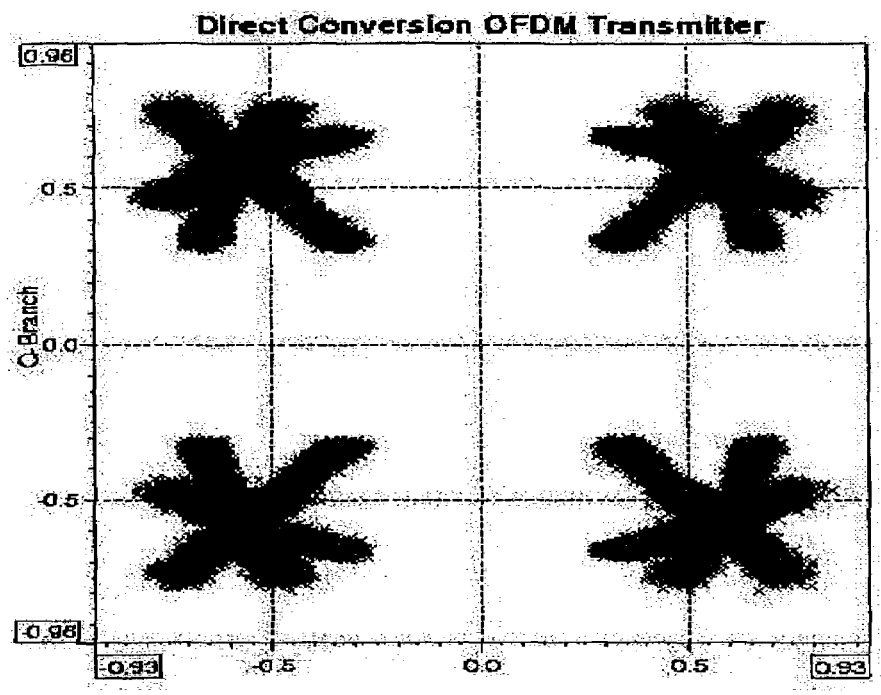
FIG. 1 shows a diagram illustrating an I-branch and Q-branch ISI generated by analog filters in a direct conversion OFDM transmitter.
Figure 12:
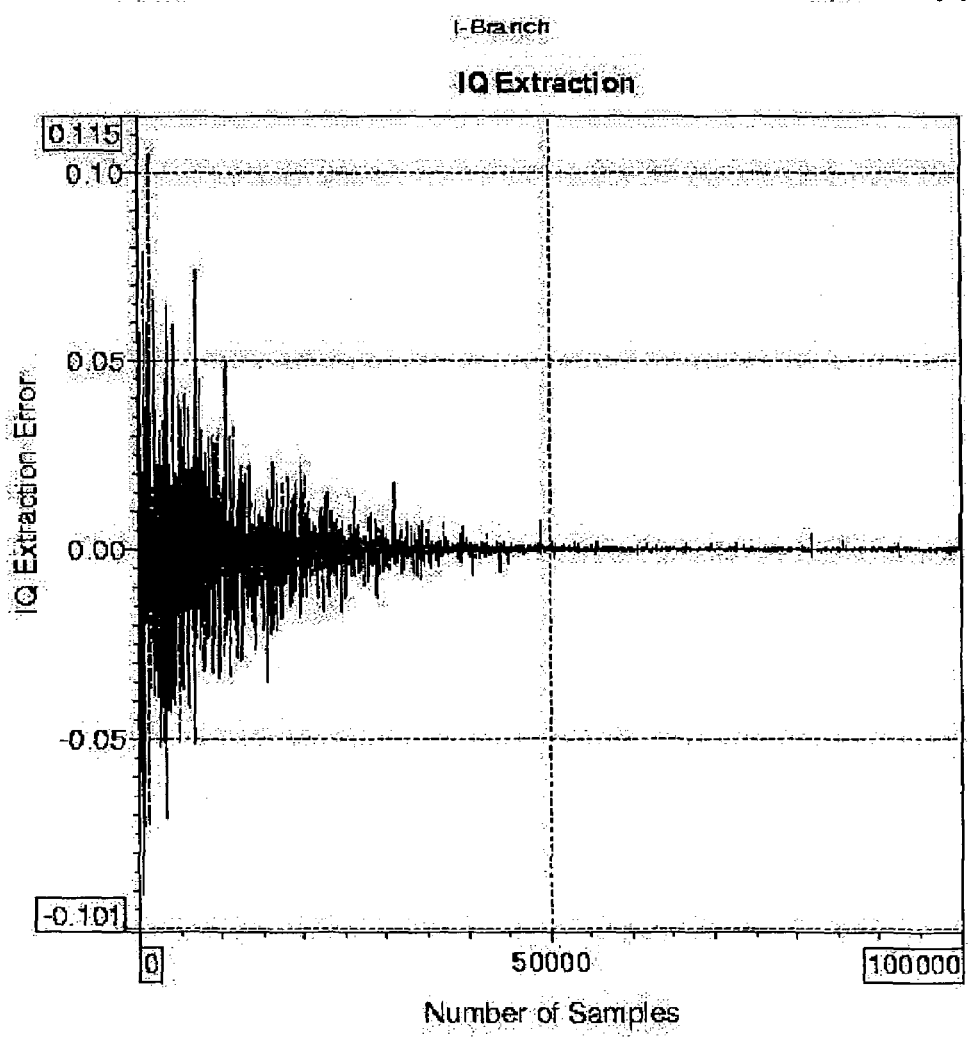
FIGS. 12 to 24 show simulation results illustrating the operation according to the present invention.
Figure 13:
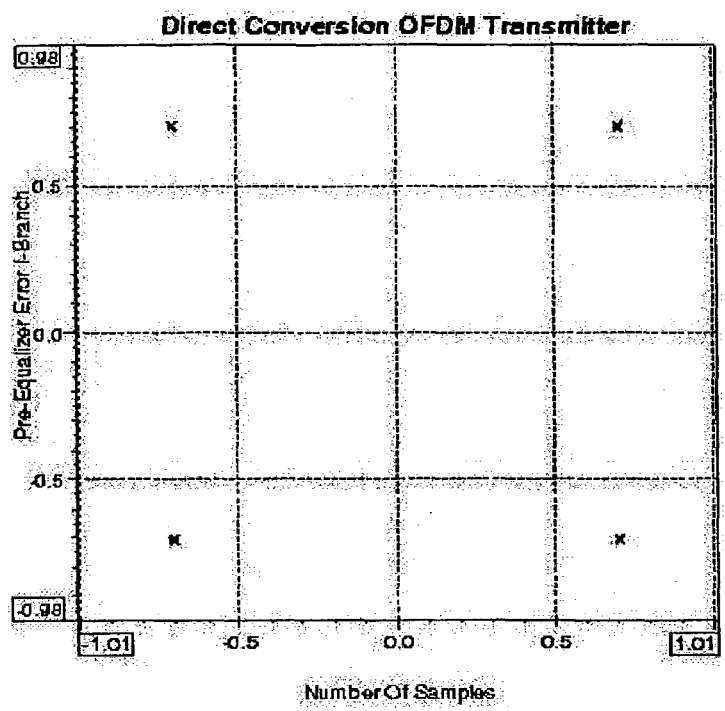

For providing the QPSK constellation diagram ideal receiver synchronization is assumed. Hence the receiver does not introduce any further errors. FIGS. 1, 12 and 13 show the analog filter imperfections, the I-branch error curve of an adaptive 19-tap pre-equalizer and the recovered IQ diagram for the QPSK modulation according to the present invention. A 64 FFT has been used. In particular, FIG. 12 shows the convergence of the IQ extraction algorithm in case of OFDM. Here only non-ideal filters are installed and only the IQ amplitude pre-equalizer is active. No IQ phase error is active. The convergence is clearly visible. The loop speed is high but the results are still precise, because linear filter effects can be handled easily by the pre-equalizer in combination with the proposed IQ envelope extraction algorithm. Loop step size is $K_{ampI}=1.0e-3$. Hence, FIG. 12 shows differences between the ideal IQ values and the IQ extraction estimation during the adjustment process of the pre-equalizer.

Figure 14:
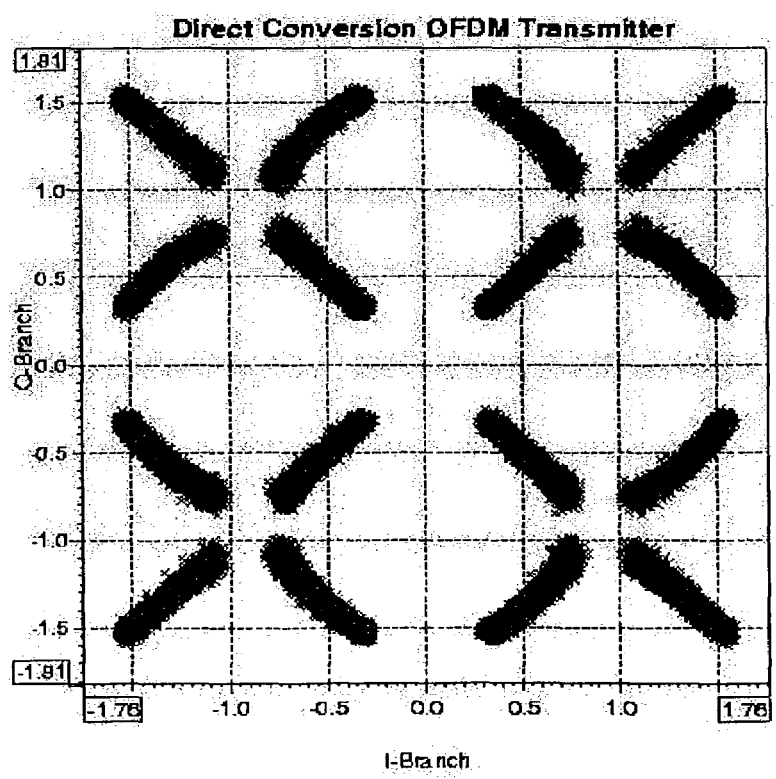
Figure 15:
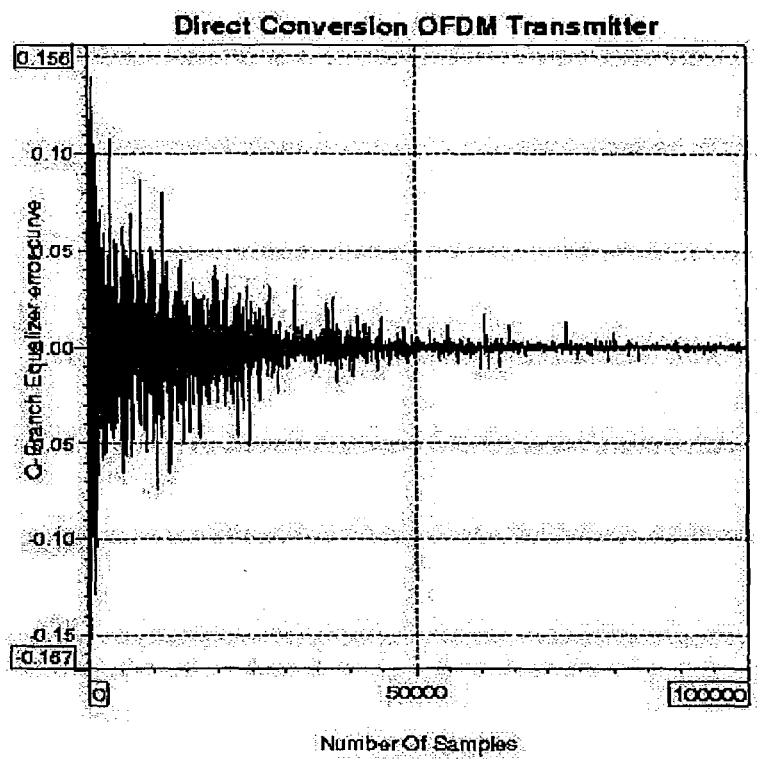
Figure 16:
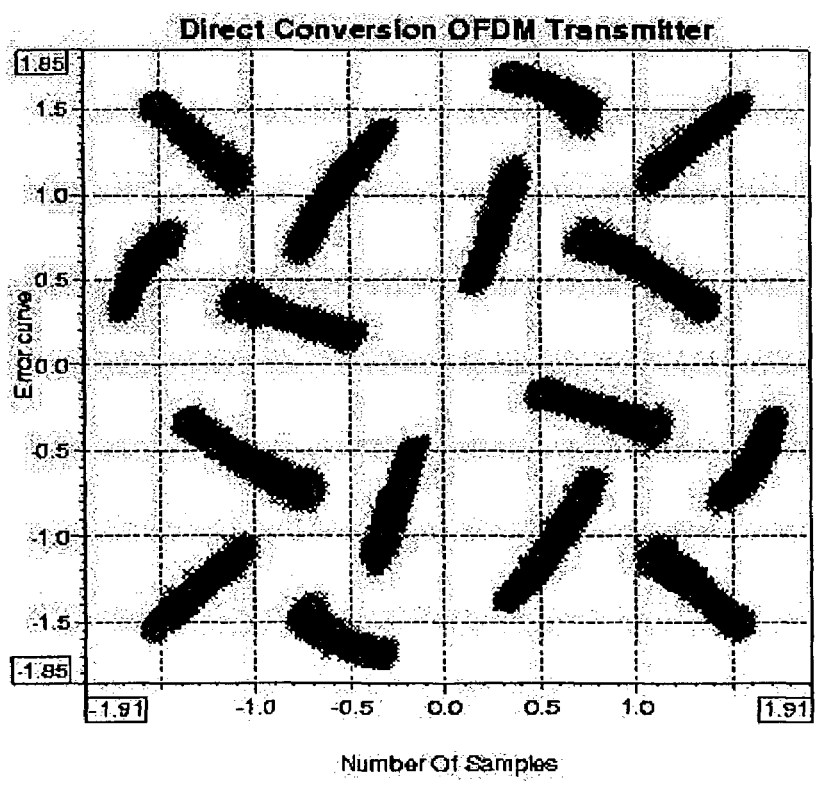

FIGS. 14 and 15 provide the same setup but now additionally an IQ amplitude imbalance error of factor 2.3 has been introduced. The time domain Q-branch has a factor 2.3 higher amplification than the I-branch. FIG. 15 shows a Q-branch pre-equalizer error curve.

Figure 17:
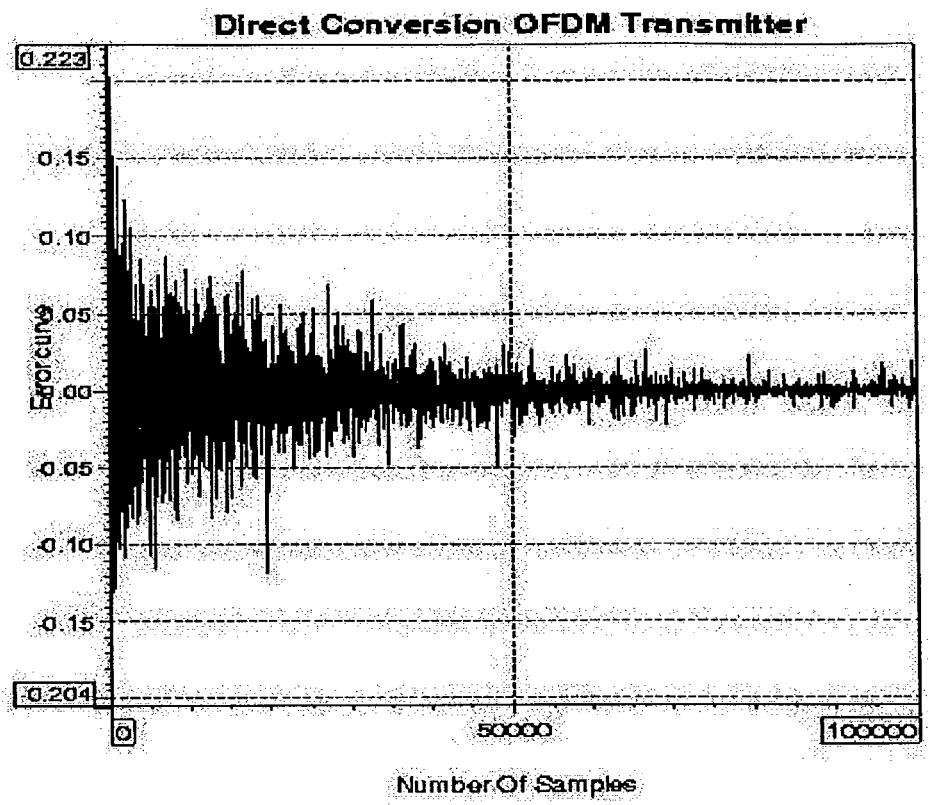
Figure 18:
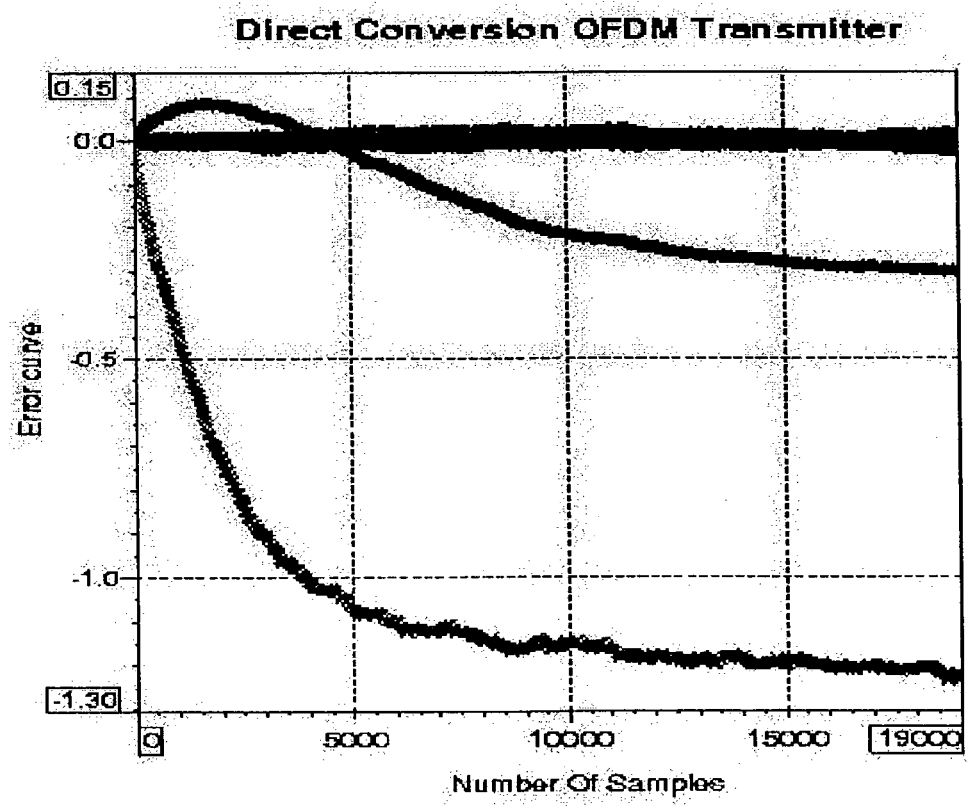
Figure 19:
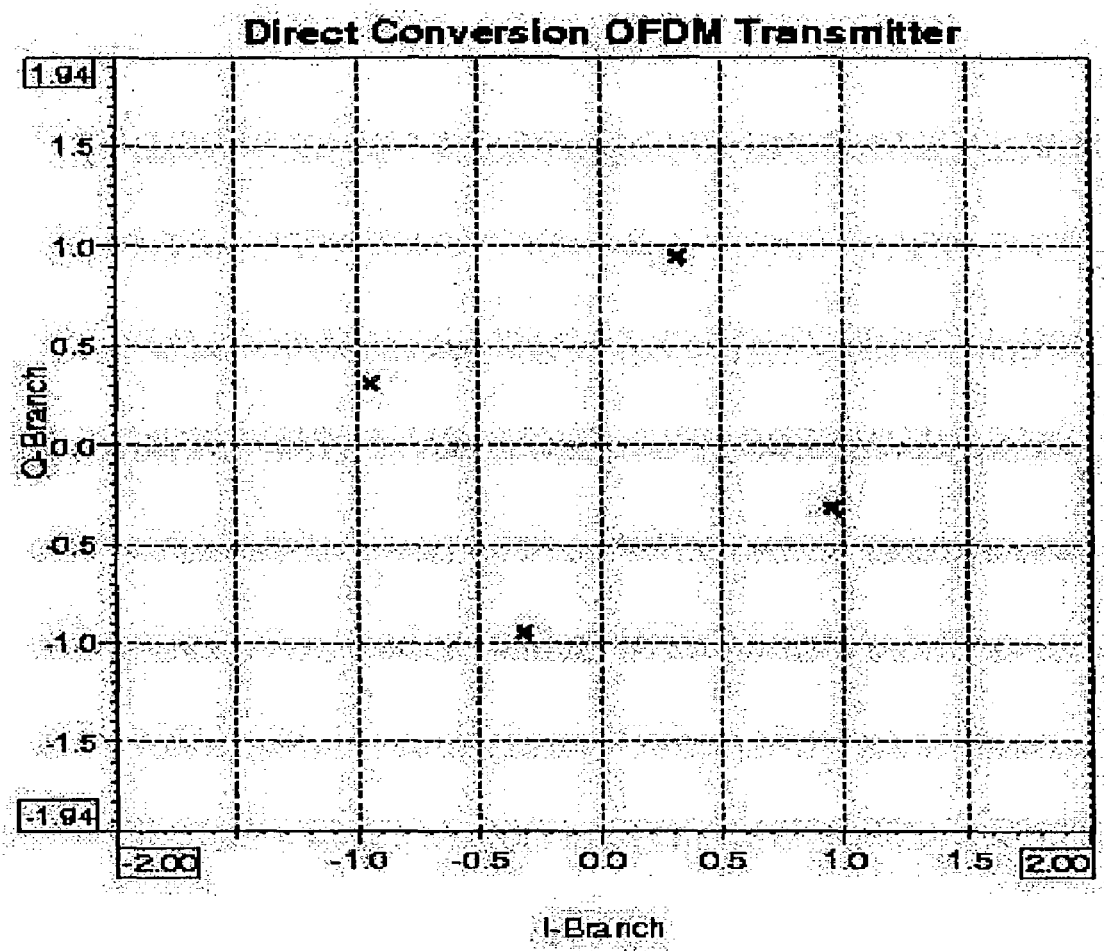

FIGS. 16 to 19 provide an IQ amplitude error of factor 2.3 and IQ phase error of angle 30°. The same analog filters as in FIG. 12 are applied. Both, the amplification factor and the phase error are inserted to the Q-branch. The IQ amplitude error is compensated for each branch itself. The phase error has a correction only in the I-branch. Because the IQ phase error is inserted to the Q-branch but corrected in the I-branch, the corrected IQ diagram keeps a remaining phase shift. FIG. 17 shows a Q-branch pre-equalizer error curve. FIG. 18 shows a 19-tap IQ phase equalizer error curve. The phase error is 0.52 radians, but because of the frequency dependency the value is changed. FIG. 19 shows a recovered QPSK diagram. The remaining phase shift results from the IQ phase imbalance correction.

Figure 20:
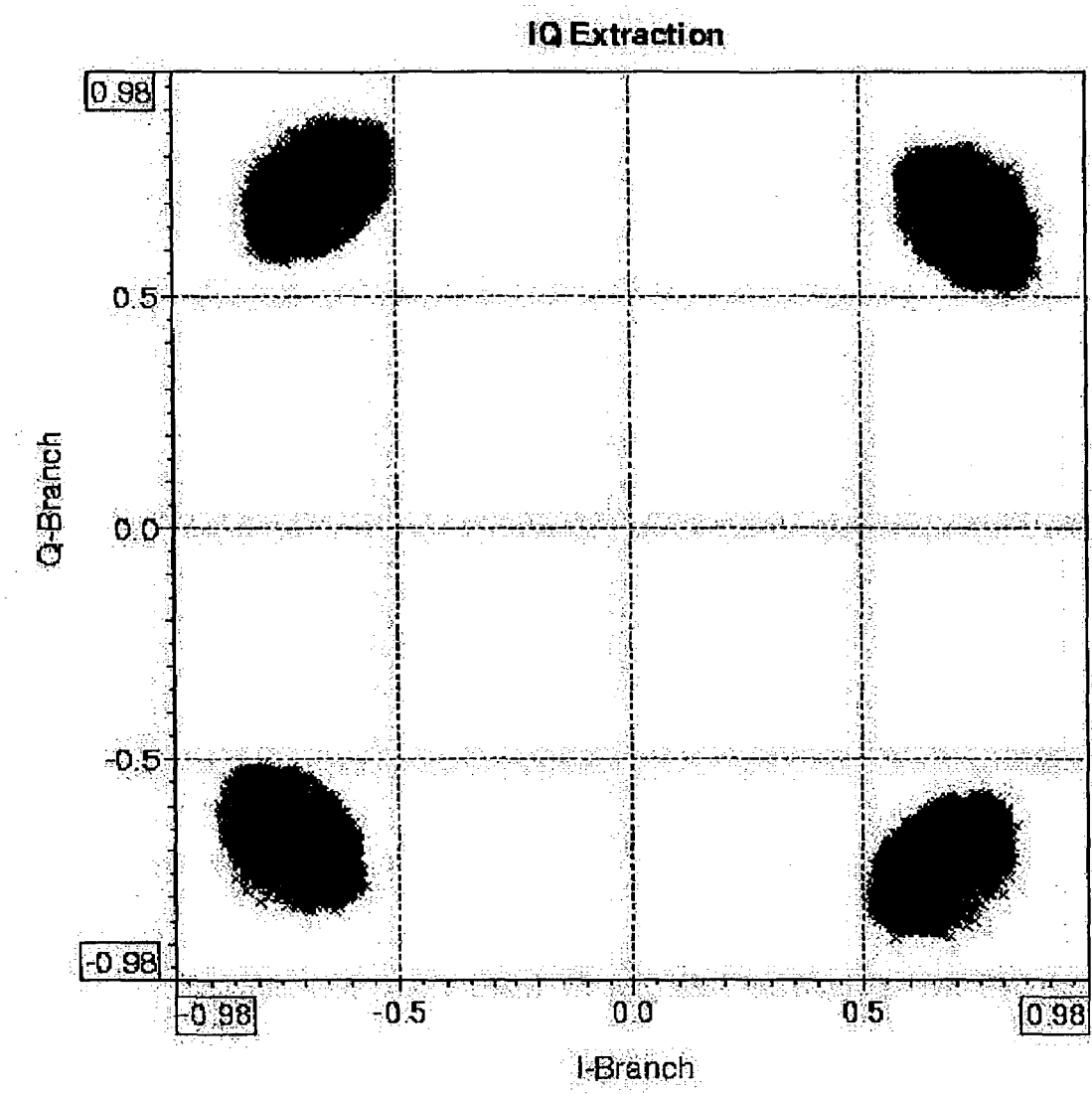

FIG. 20 shows a distorted QPSK signal constellation diagram of a 64 FFT OFDM system. A phase error φ=5° and imperfect analog filters are provided. The adjustment loops are disabled and hence there is no correction at all. The linear filter effects and the IQ phase imbalance effects provide significant imperfections to the analog signal. The constellation diagram has been demodulated on the receiver side ideally and hence only the analog IQ amplitude and IQ phase imbalance imperfections are visible.

Figure 21:
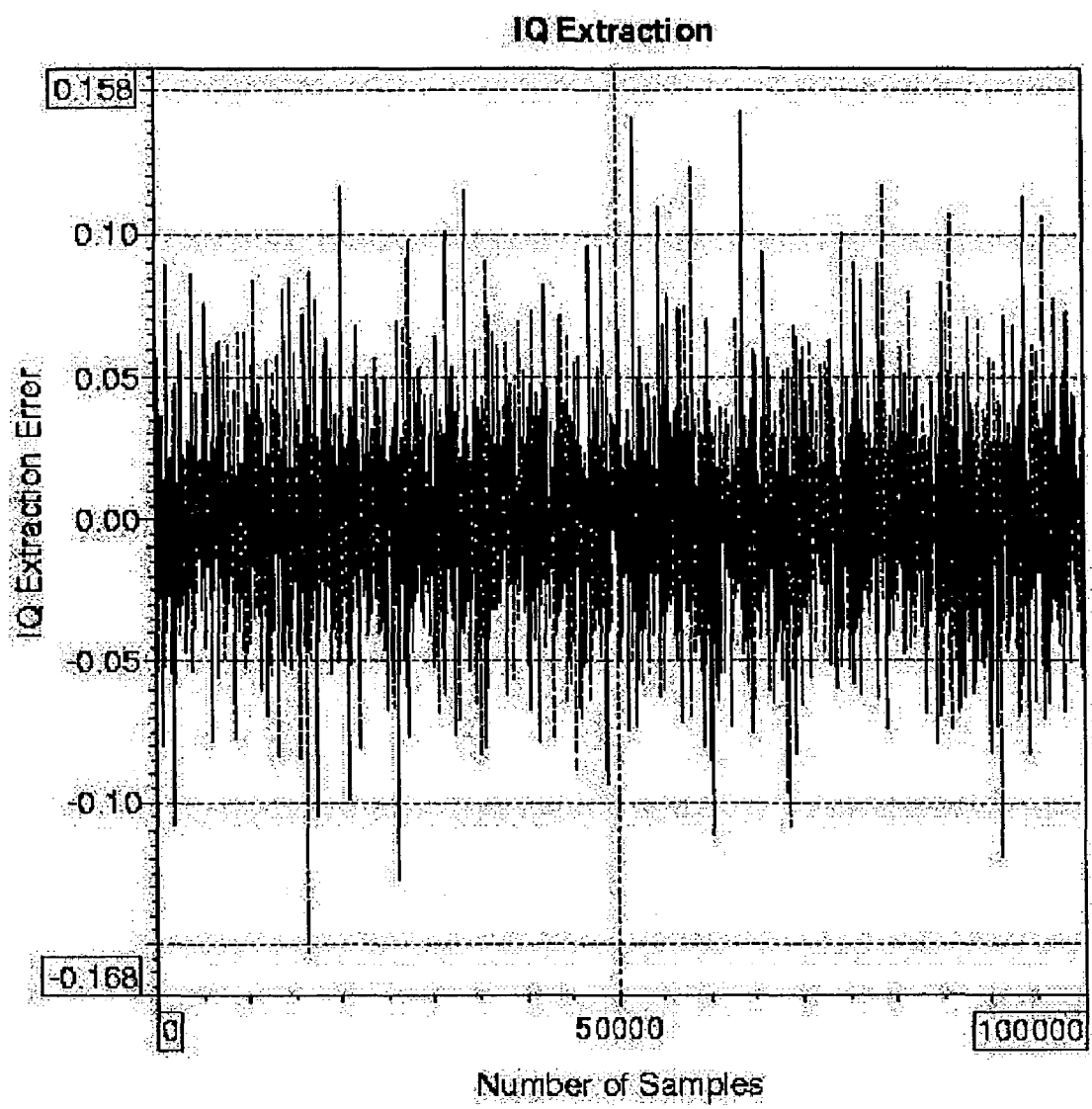

FIG. 21 shows the corresponding IQ extraction errors in the OFDM time domain. There are significant differences between the ideal IQ values and the estimated IQ values from the envelope extraction. In that figure there are analog phase imbalance and analog filter imperfections present. All adjustment loops are disabled and hence the errors keep stable. FIG. 20 provides the corresponding IQ constellation diagram on the receiver side.

Figure 22:
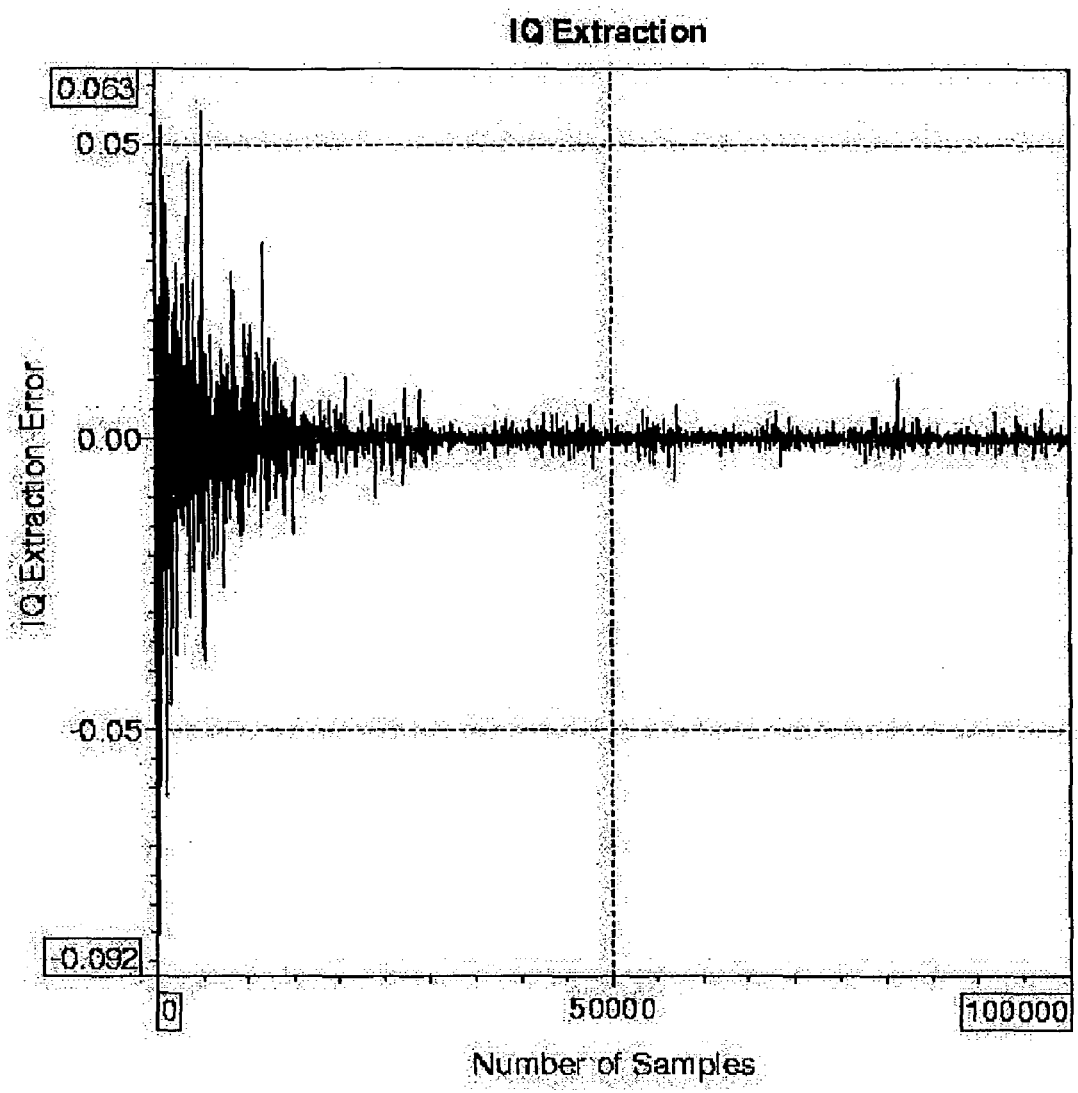

FIG. 22 provides the convergence of the IQ envelope extraction process. The differences between the ideal IQ and the estimated analog IQ values are shown. During the IQ phase and IQ amplitude error adjustment, the IQ extraction estimation is improving. The residual error is higher compared to FIG. 20. The reason for that is the high step size of the IQ phase imbalance algorithm, which is disabled in FIG. 20, because no IQ phase error is inserted. Better results can be achieved by using a smaller step size but this increases also the simulation times.

Loop parameters are $K_{ampI}$=1.0e–3 and $K_{phase}$=5.0e–3. The phase loop step size is large compared to the amplitude imbalance loop step size, because the phase estimation is based on a blind algorithm and should have less loop bandwidth than the decision aided pre-equalizer to receive same high quality of convergence.

Figure 23:
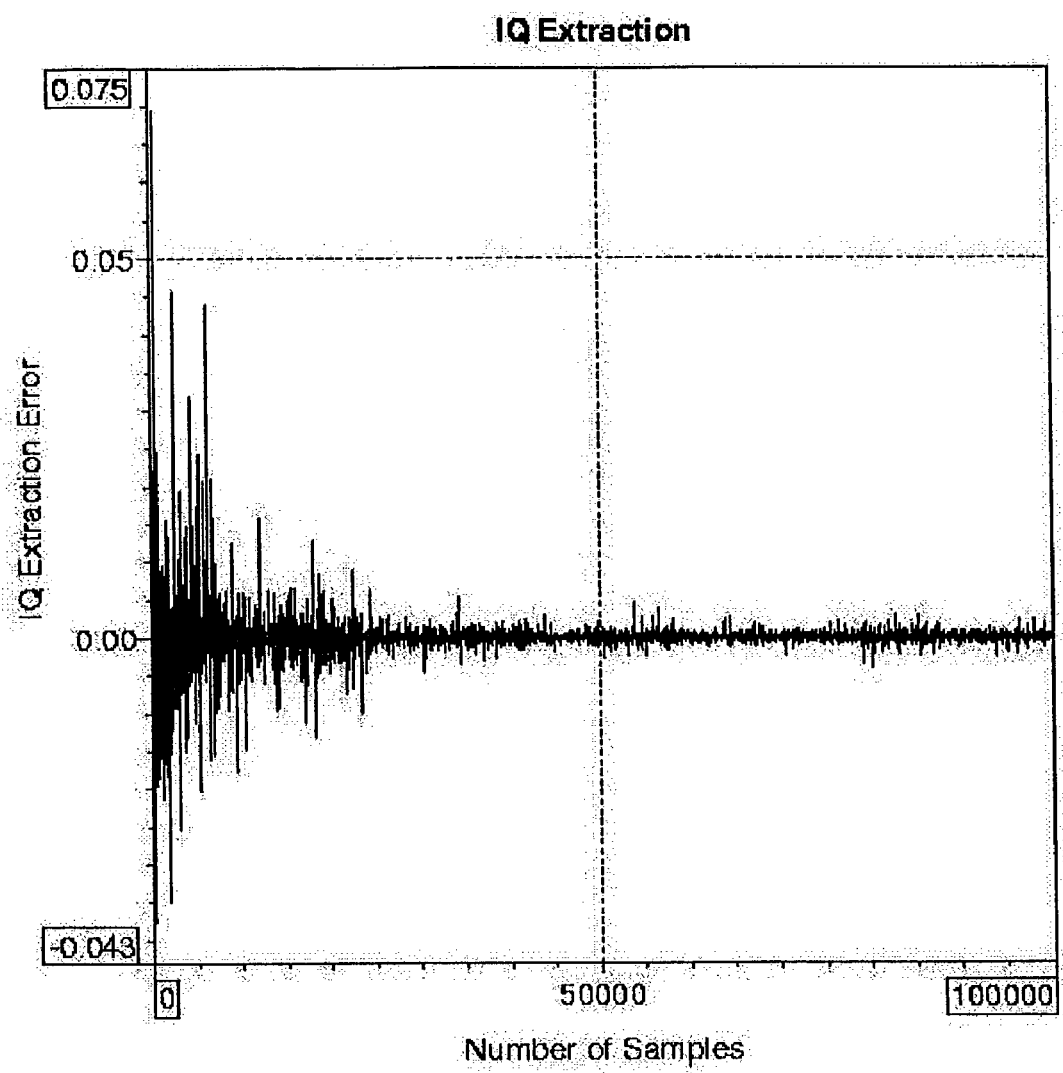

FIG. 23 provides the same results but with a little bit more accuracy, because the IQ phase imbalance loop bandwidth has been reduced. In FIG. 23, the same environment as in FIG. 22 is applied, but $K_{ampI}$=1.0e–3 and $K_{phase}$=1.0e–3.

Figure 24:
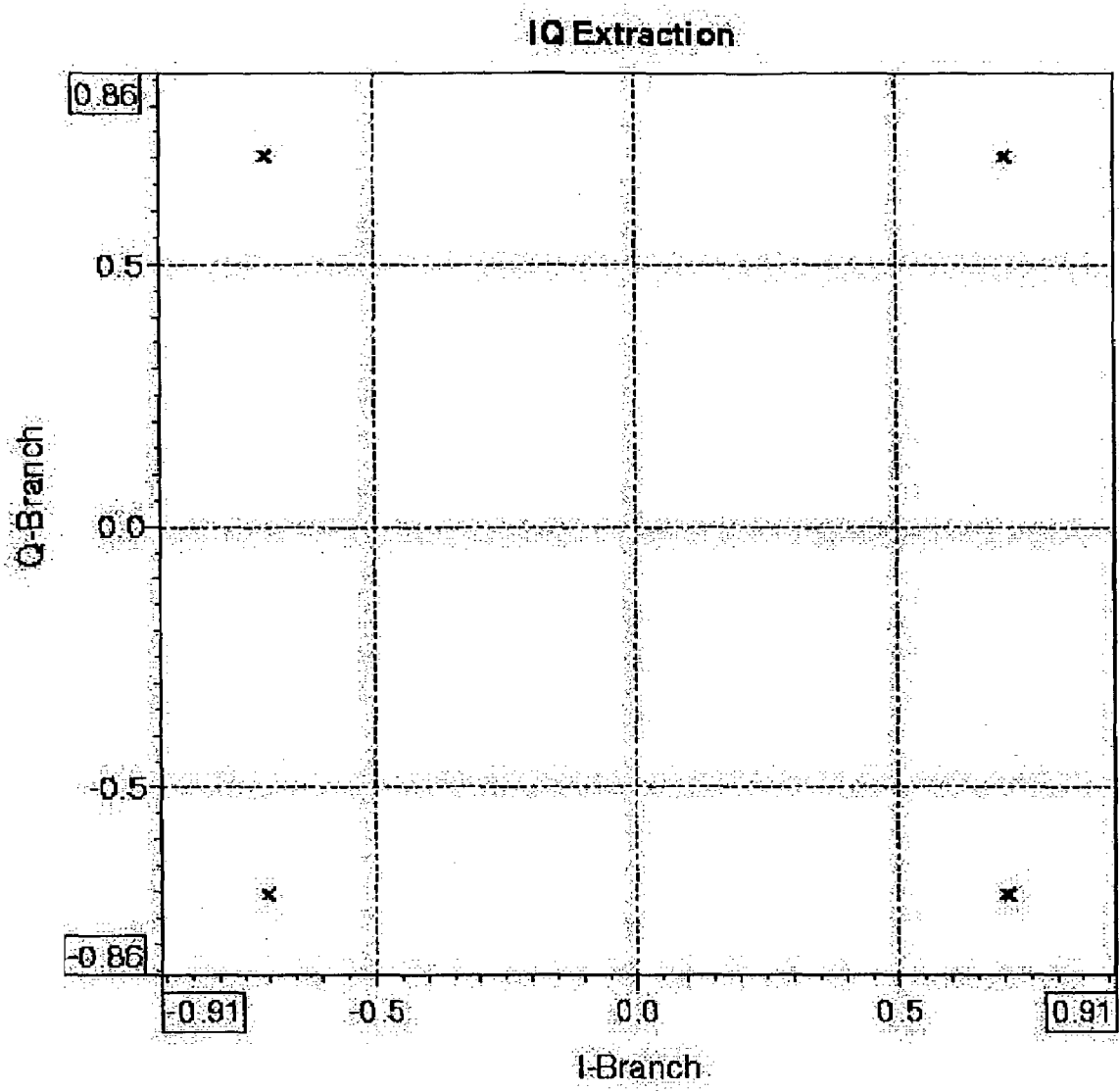

FIG. 24 provides the final corrected QPSK constellation diagram, using the IQ envelope extraction algorithm for IQ estimation. This figure corresponds to FIG. 21 and FIG. 23, respectively, and shows the results after all loops are in equilibrium. In FIG. 24, $K_{ampI}$=1.0e–3 and $K_{phase}$=1.0e–3.

The present invention provides a mathematical way to extract from an OFDM envelope based signal the I-branch and Q-branch values. The algorithm has been proofed via a pre-equalization algorithm and an IQ phase imbalance adjustment algorithm. Both IQ adjustment algorithms in combination with the here presented IQ envelope extraction algorithm show a good stability and convergence. Because of the division operators some constraints with regards to the divisor have to be considered for a possible implementation. They depend on the signal amplitudes and will differ from implementation to implementation, but they are no principle restrictions to the algorithm.

According to the preferred embodiment of the present invention, a frequency selective non-decision aided IQ phase imbalance adjustment and a frequency selective IQ amplitude adjustment are combined for direct conversion OFDM transmitters.

Additionally, analog filter miss matching is taken into account automatically because the LMS pre-equalizer works based on real coefficients and not based on a complex adaptive filter.

By using a very small loop bandwidth for both IQ adjustment algorithms, the quasi-stationary IQ phase and IQ amplitude imbalances can be handled perfectly.

The IQ symbol extraction from the envelope signal is solved by the IQ extraction algorithm.

The combination of all three algorithms provides a strong adjustment stability and provides the chance to choose very low cost devices for the direct-conversion front-end implementation.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method, comprising:

generating an original complex IQ signal;

performing error adjustment on the original complex IQ signal;

processing the adjusted complex IQ signal in a signal processing circuitry, thereby obtaining a processed real signal which is proportional to an amplitude of the adjusted complex IQ signal;

detecting an envelope of the processed real signal;

synchronizing the real signal envelope and the original complex IQ signal;

deriving the envelope of the original complex IQ signal;

comparing the synchronized real signal envelope with the synchronized original IQ signal envelope at two consecutive time instances; and obtaining a processed complex IQ signal from the real signal envelope based on a comparison result, which processed complex IQ signal is used in performing error adjustment on the original complex IQ signal, wherein comparing the synchronized real signal envelope with the synchronized original IQ signal envelope comprises comparing the synchronized real signal envelope with the synchronized original IQ signal envelope at two consecutive time instances n and n–1:

$$|A_{real}(n)| = \sqrt{y_I^2(n) + y_Q^2(n)} = |A_{original}(n)| = \sqrt{d_I^2(n) + d_Q^2(n)}$$

$$|A_{real}(n-1)| = \sqrt{y_I^2(n-1) + y_Q^2(n-1)} = |A_{original}(n-1)| = \sqrt{d_I^2(n-1) + d_Q^2(n-1)}$$

wherein $A_{real}$ is the real signal envelope, $A_{original}$ is the original IQ signal envelope, $Y_I$ is the processed In-phase signal component to be estimated, $y_Q$ is the processed Quadrature-phase signal component to be estimated, $d_I$ is the original In-phase signal component, and $d_Q$ is the original Quadrature-phase signal component, wherein the squares of the processed IQ signal components at time instance n–1 are derived as:

$$y_I^2(n-1) = \frac{y_I^2(n)}{[d_I^2(n)/d_I^2(n-1)]},$$

$$y_Q^2(n-1) = \frac{y_Q^2(n)}{[d_Q^2(n)/d_Q^2(n-1)]}$$

and with $$A_{real}^2(n-1) = \frac{y_I^2(n)}{[d_I^2(n)/d_I^2(n-1)]} + \frac{y_Q^2(n)}{[d_Q^2(n)/d_Q^2(n-1)]}$$

$$A_{real}^2(n) = y_I^2(n) + y_Q^2(n)$$

squares of the processed IQ signal components at time instance n are given by:

$$y_I^2(n) = A_{real}^2(n) - y_Q^2(n)$$

$$y_Q^2(n) = [d_Q^2(n)/d_Q^2(n-1)]\frac{(A_{real}^2(n-1)[d_I^2(n)/d_I^2(n-1)]A_{real}^2(n))}{[d_I^2(n)/d_I^2(n-1)] - [d_Q^2(n)/d_Q^2(n-1)]}$$

and finally processed IQ signal components at time instance n are derived as:

$$y_I(n) = \sqrt{y^2{}_I(n)} \cdot \text{signum}(d_I(n))$$

$$y_Q(n) = \sqrt{y^2{}_Q(n)} \cdot \text{signum}(d_Q(n))$$

wherein signum ($d_I(n)$) and signum ($d_Q(n)$) provides a sign of original complex IQ signal components.

2. The method according to claim 1, wherein performing error adjustment comprises:
  obtaining a difference between the processed complex IQ signal and the original complex IQ signal to be input into an equalizing function;
  approximating a gradient of the difference based on the obtained difference and an approximation of the transmission characteristic;
  updating control values of the equalizing function based on the approximated gradient; and
  equalizing the original complex IQ signal in accordance with the equalizing function.

3. The method according to claim 2, further comprising:
  subjecting an obtained difference between the processed complex IQ signal and the original complex IQ signal to filtering; and
  approximating the gradient of the difference based on the obtained filtered difference and an approximation of the transmission characteristic.

4. The method according to claim 1, wherein performing error adjustment comprises:
  performing a frequency selective IQ phase error estimation based on the processed complex IQ signal; and
  correcting the original complex IQ signal with frequency selective correction factors based on the error estimation.

5. The method according to claim 4, further comprising:
  subjecting the frequency selective IQ phase error estimation to filtering; and
  correcting the original complex IQ signal with frequency selective correction factors based on a filtered error estimation.

6. The method according to claim 1, wherein performing error adjustment comprises:
  obtaining a difference between the processed complex IQ signal and the original complex IQ signal to be input into an equalizing function;
  approximating a gradient of the difference based on the obtained difference and an approximation of the transmission characteristic;
  updating control values of the equalizing function based on the approximated gradient;
  equalizing the original complex IQ signal in accordance with the equalizing function;
  performing a frequency selective IQ phase error estimation based on the processed complex IQ signal; and
  correcting the equalized complex IQ signal with frequency selective correction factors based on the error estimation.

7. The method according to claim 1, further comprising:
  subjecting the adjusted complex IQ signal to filtering.

8. The method according to claim 1, wherein the generating the original complex IQ signal comprises generating a signal in a digital domain and the obtaining the processed real signal comprises obtaining an analog real signal with an envelope of the analog real signal being converted into a digital real signal envelope before comparing the synchronized real signal envelope with the synchronized original IQ signal envelope.

9. An apparatus, comprising:
  means for generating an original complex IQ signal;
  means for performing error adjustment on the original complex IQ signal;
  means for processing an adjusted complex IQ signal in a signal processing circuitry, thereby obtaining a processed real signal which is proportional to an amplitude of the adjusted complex IQ signal;
  means for detecting an envelope of the processed real signal;
  means for synchronizing the real signal envelope and the original complex IQ signal;
  means for deriving an envelope of the original complex IQ signal;
  means for comparing a synchronized real signal envelope with a synchronized original IQ signal envelope at two consecutive time instances; and
  means for obtaining a processed complex IQ signal from the real signal envelope based on a comparison result, which processed complex IQ signal is used in the means for performing error adjustment,
  wherein the means for comparing compares the synchronized real signal envelope with the synchronized original IQ signal envelope at two consecutive time instances n and n−1:

$$|A_{real}(n)| = \sqrt{y_I^2(n) + y_Q^2(n)} = |A_{original}(n)| = \sqrt{d_I^2(n) + d_Q^2(n)}$$

$$|A_{real}(n-1)| = \sqrt{y_I^2(n311) + y_Q^2(n311)} = |A_{original}(n311)| = \sqrt{d_I^2(n311) + d_Q^2(n311)}$$

wherein $A_{real}$ is the real signal envelope, $A_{original}$ is the original IQ signal envelope, $Y_I$ is the processed In-phase signal component to be estimated, $y_Q$ is the processed Quadrature-phase signal component to be estimated, $d_I$ is the original In-phase signal component, and $d_Q$ is the original Quadrature-phase signal component, wherein the squares of the processed IQ signal components at time instance n−1 are derived as:

$$y_I^2(n-1) = \frac{y_I^2(n)}{[d_I^2(n)/d_I^2(n-1)]}$$

$$y_Q^2(n-1) = \frac{y_Q^2(n)}{[d_Q^2(n)/d_Q^2(n-1)]}$$

and with $$A_{real}^2(n-1) = \frac{y_I^2(n)}{[d_I^2(n)/d_I^2(n-1)]} + \frac{y_Q^2(n)}{[d_Q^2(n)/d_Q^2(n-1)]}$$

$$A_{real}^2(n) = y_I^2(n) + y_Q^2(n)$$

squares of the processed IQ signal components at time instance n are given by:

$$y_I^2(n) = A_{real}^2(n) - y_Q^2(n)$$

-continued $$y_Q^2(n) = [d_Q^2(n)/d_Q^2(n-1)]\frac{(A_{real}^2(n-1)[d_I^2(n)/d_I^2(n-1)] - A_{real}^2(n))}{[d_I^2(n)/d_I^2(n-1)] - [d_Q^2(n)/d_Q^2(n-1)]}$$

and finally processed IQ signal components at time instance n are derived as:

$$y_I(n) = \sqrt{y^2_I(n)} \cdot \text{signum}(d_I(n))$$

$$y_Q(n) = \sqrt{y^2_Q(n)} \cdot \text{signum}(d_Q(n))$$

wherein signum $(d_I(n))$ and signum $(d_Q(n))$ provides a sign of original complex IQ signal components.

10. The apparatus according to claim 9, wherein the means for performing error adjustment comprises:
  means for obtaining a difference between the processed complex IQ signal and the original complex IQ signal to be input into an equalizing function;
  means for approximating a gradient of the difference based on the obtained difference and an approximation of the transmission characteristic;
  means for updating control values of the equalizing function based on the approximated gradient; and
  means for equalizing the original complex IQ signal in accordance with the equalizing function.

11. The apparatus according to claim 10, wherein the means for performing error adjustment comprises:
  means for filtering an obtained difference between the processed complex IQ signal and the original complex IQ signal,
  wherein the means for approximating approximates a gradient of the difference based on a obtained filtered difference and the approximation of the transmission characteristic.

12. The apparatus according to claim 9, wherein the means for performing error adjustment comprises:
  means for performing a frequency selective IQ phase error estimation on based on the processed complex IQ signal; and
  means for correcting the original complex IQ signal with frequency selective correction factors based on the error estimation.

13. The apparatus according to claim 12, wherein the means for performing error adjustment comprises:
  means for filtering the frequency selective IQ phase error estimation; wherein the means for correcting corrects the original complex IQ signal with frequency selective correction factors based on the filtered error estimation.

14. The apparatus according to claim 9, wherein the means for performing error adjustment comprises:
  means for obtaining a difference between the processed complex IQ signal and the original complex IQ signal to be input into an equalizing function;
  means for approximating a gradient of the difference based on the obtained difference and an approximation of the transmission characteristic;
  means for updating control values of the equalizing function based on the approximated gradient;
  means for equalizing the original complex IQ signal in accordance with the equalizing function;
  means for performing a frequency selective IQ phase error estimation based on the processed complex IQ signal; and
  means for correcting the equalized complex IQ signal with frequency selective correction factors based on the error estimation.

15. An orthogonal frequency-division multiplexing system comprising a direct conversion analog front end architecture, the system comprising the apparatus according to claim 9.

16. The apparatus according to claim 9, further comprising:
  means for filtering the adjusted complex IQ signal.

17. The apparatus according to claim 9, wherein the means for generating the original complex IQ signal is configured to generate a digital signal, the processed real signal being an analog real signal, the apparatus further comprising:
  means for converting an envelope of the analog real signal into a digital real signal envelope that is input into the means for comparing.

18. An apparatus, comprising:
  a modulator configured to receive a digital base band signal and output a modulated signal;
  a transformer configured to transform the modulated signal from the frequency domain to the time domain and output a transformed signal;
  an error corrector configured to receive the transformed signal;
  an IQ error detector configured to receive the transformed signal;
  an envelope IQ extractor configured to receive the transformed signal and real signal which is proportional to an amplitude of a complex error corrected IQ signal, to compare a synchronized real signal envelope with a synchronized original IQ envelope at two consecutive time instances, and to provide an estimated signal to the IQ error detection block;
  wherein the IQ error detector is further configured to receive the estimated signal, detect error in the transformed signal, and output filter coefficients to the error corrector;
  wherein the error corrector is further configured to receive the filter coefficients, perform error adjustment on the transformed signal using the filter coefficients, and output a signal that can be used to generate the real signal,
  wherein the envelope IQ extractor compares the synchronized real signal envelope with the synchronized original IQ signal envelope at two consecutive time instances n and n−1:

$$|A_{real}(n)| = \sqrt{y_I^2(n) + y_Q^2(n)} = |A_{original}(n)| = \sqrt{d_I^2(n) + d_Q^2(n)}$$

$$|A_{real}(n-1)| = \sqrt{y_I^2(n311) + y_Q^2(n311)} = |A_{original}(n311)| = \sqrt{d_I^2(n311) + d_Q^2(n311)}$$

wherein $A_{real}$ is the real signal envelope, $A_{original}$ is the original IQ signal envelope, $Y_I$ is the processed In-phase signal component to be estimated, $y_Q$ is the processed Quadrature-phase signal component to be estimated, $d_I$ is the original In-phase signal component, and $d_Q$ is the original Quadrature-phase signal component, wherein the squares of the processed IQ signal components at time instance n−1 are derived as:

$$y_I^2(n-1) = \frac{y_I^2(n)}{[d_I^2(n)/d_I^2(n-1)]}$$

$$y_Q^2(n-1) = \frac{y_Q^2(n)}{[d_Q^2(n)/d_Q^2(n-1)]}$$

-continued and with $$A_{real}^2(n-1) = \frac{y_I^2(n)}{[d_I^2(n)/d_I^2(n-1)]} + \frac{y_Q^2(n)}{[d_Q^2(n)/d_Q^2(n-1)]}$$

$$A_{real}^2(n) = y_I^2(n) + y_Q^2(n)$$

squares of the processed IQ signal components at time instance n are given by:

$$y_I^2(n) = A_{real}^2(n) - y_Q^2(n)$$

$$y_Q^2(n) = [d_Q^2(n)/d_Q^2(n-1)]\frac{(A_{real}^2(n-1)[d_I^2(n)/d_I^2(n-1)] - A_{real}^2(n))}{[d_I^2(n)/d_I^2(n-1)] - [d_Q^2(n)/d_Q^2(n-1)]}$$

and finally processed IQ signal components at time instance n are derived as:

$$y_I(n) = \sqrt{y_I^2(n)} \cdot \text{signum}(d_I(n))$$

$$y_Q(n) = \sqrt{y_Q^2(n)} \cdot \text{signum}(d_Q(n))$$

wherein signum ($d_I(n)$) and signum ($d_Q(n)$) provides a sign of original complex IQ signal components.

19. An apparatus, comprising:
a signal generator configured to generate an original complex IQ signal;
an error adjustor configured to perform error adjustment on the original complex IQ signal;
a processor configured to process an adjusted complex IQ signal in the signal processing circuitry, and to obtain a processed real signal which is proportional to an amplitude of the adjusted complex IQ signal;
a detector configured to detect an envelope of the processed real signal;
a synchronizer configured to synchronize the real signal envelope and the original complex IQ signal;
an envelope deriver configured to derive an envelope of the original complex IQ signal;
a comparer configured to compare a synchronized real signal envelope with a synchronized original IQ signal envelope at two consecutive time instances; and
an obtainer configured to obtain a processed complex IQ signal from the real signal envelope based on a comparison result, which processed complex IQ signal is used in the error adjustor configured to perform error adjustment,
wherein the comparer is configured to compare the synchronized real signal envelope with the synchronized original IQ signal envelope at two consecutive time instances n and n−1:

$$|A_{real}(n)| = \sqrt{y_I^2(n) + y_Q^2(n)} = |A_{original}(n)| = \sqrt{d_I^2(n) + d_Q^2(n)}$$

$$|A_{real}(n-1)| = \sqrt{y_I^2(n311) + y_Q^2(n311)} = |A_{original}(n31\,1)| = \sqrt{d_I^2(n311) + d_Q^2(n311)}$$

wherein $A_{real}$ is the real signal envelope, $A_{original}$ is the original IQ signal envelope, $y_I$ is the processed In-phase signal component to be estimated, $y_Q$ is the processed Quadrature-phase signal component to be estimated, $d_I$ is the original In-phase signal component, and $d_Q$ is the original Quadrature-phase signal component, wherein the squares of the processed IQ signal components at time instance n−1 are derived as:

$$y_I^2(n-1) = \frac{y_I^2(n)}{[d_I^2(n)/d_I^2(n-1)]}$$

$$y_Q^2(n-1) = \frac{y_Q^2(n)}{[d_Q^2(n)/d_Q^2(n-1)]}$$

and with $$A_{real}^2(n-1) = \frac{y_I^2(n)}{[d_I^2(n)/d_I^2(n-1)]} + \frac{y_Q^2(n)}{[d_Q^2(n)/d_Q^2(n-1)]}$$

$$A_{real}^2(n) = y_I^2(n) + y_Q^2(n)$$

squares of the processed IQ signal components at time instance n are given by:

$$y_I^2(n) = A_{real}^2(n) - y_Q^2(n)$$

$$y_Q^2(n) = [d_Q^2(n)/d_Q^2(n-1)]\frac{(A_{real}^2(n-1)[d_I^2(n)/d_I^2(n-1)] - A_{real}^2(n))}{[d_I^2(n)/d_I^2(n-1)] - [d_Q^2(n)/d_Q^2(n-1)]}$$

and finally processed IQ signal components at time instance n are derived as:

$$y_I(n) = \sqrt{y_I^2(n)} \cdot \text{signum}(d_I(n))$$

$$y_Q(n) = \sqrt{y_Q^2(n)} \cdot \text{signum}(d_Q(n))$$

wherein signum ($d_I(n)$) and signum ($d_Q(n)$) provides a sign of original complex IQ signal components.

20. The apparatus according to claim 19, wherein the error adjustor is configured to:
obtain a difference between the processed complex IQ signal and the original complex IQ signal to be input into an equalizing function,
approximate a gradient of the difference based on the obtained difference and an approximation of the transmission characteristic,
update control values of the equalizing function based on the approximated gradient, and
to equalize the original complex IQ signal in accordance with the equalizing function.

21. The apparatus according to claim 20, wherein the error adjustor comprises:
a filter configured to filter an obtained difference between the processed complex IQ signal and the original complex IQ signal,
wherein the error adjuster is configured to approximate a gradient of the difference based on a obtained filtered difference and the approximation of the transmission characteristic.

22. The apparatus according to claim 19, wherein the error adjustor is configured to:
perform a frequency selective IQ phase error estimation on based on the processed complex IQ signal, and
correct the original complex IQ signal with frequency selective correction factors based on the error estimation.

23. The apparatus according to claim 22, wherein the error adjustor is configured to filter the frequency selective IQ phase error estimation;

wherein the error adjustor is configured to correct the original complex IQ signal with frequency selective correction factors based on the filtered error estimation.

24. The apparatus according to claim 19, wherein the error adjustor is configured to:
- obtain a difference between the processed complex IQ signal and the original complex IQ signal to be input into an equalizing function,
- approximate a gradient of the difference based on the obtained difference and an approximation of the transmission characteristic,
- update control values of the equalizing function based on the approximated gradient,
- equalize the original complex IQ signal in accordance with the equalizing function,
- perform a frequency selective IQ phase error estimation based on the processed complex IQ signal, and
- correct the equalized complex IQ signal with frequency selective correction factors based on the error estimation.

25. An orthogonal frequency-division multiplexing system comprising a direct conversion analog front end architecture, the system comprising the apparatus according to claim 19.

26. The apparatus according to claim 19, further comprising:
- a filter configured to filter the adjusted complex IQ signal.

27. The apparatus according to claim 19, wherein the signal generator is configured to generate a digital signal, the processed real signal being an analog real signal, the apparatus further comprising:
- a converter configured to convert an envelope of the analog real signal into a digital real signal envelope that is input into the comparer.

* * * * *